(12) United States Patent
Kamiya et al.

(10) Patent No.: US 6,202,934 B1
(45) Date of Patent: Mar. 20, 2001

(54) AIR CONDITIONER FOR A VEHICLE HAVING INFRARED RAY SENSOR

(75) Inventors: Toshifumi Kamiya, Takahama; Takayoshi Kawai, Hoi-gun; Yoshinori Ichishi, Kariya; Yuichi Kajino, Nagoya; Akira Ohga, Kariya; Katsuyoshi Nishii, Okazaki; Hiroshi Ando, Nagoya, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/652,546

(22) Filed: Aug. 31, 2000

(30) Foreign Application Priority Data

| Sep. 3, 1999 | (JP) | 11-250792 |
| Oct. 25, 1999 | (JP) | 11-302703 |
| Jun. 21, 2000 | (JP) | 12-186317 |

(51) Int. Cl.<sup>7</sup> ..................... B60H 1/00
(52) U.S. Cl. ............. 236/91 C; 236/91 E; 236/51; 165/204; 165/291; 454/75
(58) Field of Search ............... 236/49.3, 91 C, 236/91 F, 51, 91 E; 454/75; 62/186, 203, 208, 209, 244; 165/202, 203, 204, 288, 291

(56) References Cited

U.S. PATENT DOCUMENTS

| 5,186,682 | * | 2/1993 | Iida ...................... 236/91 C |
| 5,340,021 | * | 8/1994 | Kajino et al. .............. 236/49.3 |
| 5,427,313 | * | 6/1995 | Davis, Jr. et al. ............ 236/91 C |
| 5,547,125 | * | 8/1996 | Hennessee et al. ........... 236/49.3 |
| 5,653,385 | * | 8/1997 | Honda et al. ............... 165/204 X |
| 5,937,940 | * | 8/1999 | Davis, Jr. et al. ........... 165/291 X |

FOREIGN PATENT DOCUMENTS

| 10-197348 | 7/1998 | (JP). |
| 10-230728 | 9/1998 | (JP). |

\* cited by examiner

*Primary Examiner*—Harry B. Tanner
(74) *Attorney, Agent, or Firm*—Harness, Dickey & Pierce, PLC

(57) ABSTRACT

An air conditioner for a vehicle which accurately estimates a thermal load to enhance inside temperature controllability. The air conditioner comprises a first surface temperature sensor for detecting a temperature of an internal surface region of a vehicle compartment which varies with a temperature of an external surface of a vehicle, and a second surface temperature sensor for detecting a temperature of a surface region which varies with an intensity of solar radiation intruding into the vehicle compartment. A target blowout air temperature is calculated using input signals including surface temperature signals detected by these sensors. Thus, intrusion heat (thermal load) due to a difference between an inside air temperature and a compartment internal surface temperature can be directly estimated to enable accurate thermal load calculation. Further, intrusion heat (thermal load) due to solar radiation into the vehicle compartment can be estimated using a temperature of an internal surface region which varies with solar radiation, thereby making it possible to carry out thermal load calculation with high accuracy.

29 Claims, 17 Drawing Sheets

AIR CONDITIONER FOR A VEHICLE HAVING INFRARED RAY SENSOR

CROSS REFERENCE TO RELATED APPLICATION

The present invention relates to and incorporates herein by reference Japanese patent applications No. 11-250792, filed Sep. 3, 1999, No. 11-302703, filed Oct. 25, 1999, and No. 2000-186317, filed Jun. 21, 2000.

BACKGROUND OF THE INVENTION

The present invention relates generally to an air conditioner for a vehicle, and more particularly to an air conditioner for a vehicle capable of automatically regulating an inside air temperature in a vehicle compartment to a preset temperature as desired by a vehicle occupant.

Due to large thermal loads on an air conditioner cooling system mounted in a vehicle, differences between the inside space air temperature (inside air temperature) and internal surface temperature of the vehicle compartment (e.g., internal surface temperature of window glass) cause heating. Also, solar radiation may heat the vehicle compartment. The temperature of the internal surface of the vehicle compartment, related to this heating, is influenced by the external surface temperature of the vehicle (e.g., external surface temperature of window glass). The temperature of the external surface of the vehicle is also influenced by outside air temperature and solar radiation.

Therefore, a conventional air conditioner for a vehicle is equipped with an inside air temperature sensor for detecting inside air temperature, an outside air temperature sensor for detecting outside air temperature and a solar radiation sensor for detecting an intensity level of solar radiation. In this arrangement, the thermal load is estimated indirectly according to signals supplied from these sensors, and a level of the latter thermal load is estimated using a solar radiation intensity level detected by the solar radiation sensor. Based on the thermal load levels thus estimated, calculations are performed to attain a target value of a blowout air temperature (target blowout air temperature), a control target voltage for an air blower, etc.

Further, in a conventional air conditioner for a vehicle disclosed in JP-A-10-230728 or JP-A-10-197348, infrared ray sensors (surface temperature sensors) arranged in a matrix form are used instead of the above inside air temperature sensor and solar radiation sensor to detect a surface temperature of a vehicle occupant. According to temperature signals from these infrared ray sensors, ambient temperature and a solar radiation intensity level is estimated in the vicinity of the vehicle occupant.

However, in this system, an estimated thermal load may not meet an actual thermal load in some cases. As such, accurate interior temperature control cannot be attained. Further, in the latter conventional air conditioner, a thermal load is estimated indirectly according to a solar radiation intensity level estimated from the surface temperature of the vehicle occupant. This creates the same problem as in the former conventional air conditioner for a vehicle.

SUMMARY OF THE INVENTION

To address these and other aforementioned drawbacks, the present invention provides an air conditioner for a vehicle.

In an air conditioner according to the present invention, a target blowout air temperature is calculated using input signals including a set temperature signal, an inside air temperature signal detected by an inside air temperature sensor, a first surface temperature signal detected by a first surface temperature sensor, and a second surface temperature signal detected by a second surface temperature sensor.

In this arrangement, the first surface temperature sensor detects a temperature of an internal surface of window glass. The internal surface of window glass is an internal surface region of the vehicle compartment, which is directly exposed to inside air directly influenced by thermal load. Therefore, unlike the conventional air conditioners in which a thermal load is estimated using an inside air temperature, an outside air temperature and a solar radiation intensity level, thermal load is directly estimated by the difference between an inside air temperature and a compartment internal surface temperature. The second surface temperature sensor detects a surface temperature of the vehicle occupant's clothing. The clothing of the vehicle occupant is a surface region that is influenced by solar radiation and directly exposed to inside air. By detecting a temperature of this surface region, intrusion heat (thermal load) due to solar radiation into the vehicle compartment is accurately estimated.

According to another aspect of the invention, the second surface temperature sensor is used to detect a temperature of a surface of the vehicle occupant. The second surface temperature sensor detects the surface temperatures of clothing and skin of the vehicle occupant. The surface temperature of occupant's skin is closely related with the occupant. Therefore, the proper interior temperature control meeting the occupant's sensed temperature can be performed by calculating a target blowout air temperature according to the occupant's skin surface temperature.

In another aspect of the invention, a third surface temperature signal detected by a third surface temperature sensor. Here, the surface temperature of occupant's skin closely relates to the sensed temperature of the occupant. This temperature is detected by the third surface temperature sensor to calculate a target blowout air temperature.

In another aspect of the present invention, the surface temperature sensor detects a surface temperature of an outside-air-temperature-related internal region. This region varies with outside temperature and the surface temperature of a solar-radiation-related internal region which varies with the intensity of solar radiation. Wherein, a target blowout air temperature is calculated using input signals including a set temperature signal, a sensed temperature information signal, and a surface temperature signal. Here, the surface temperature sensor detects temperatures of internal surface regions which are directly exposed to inside air to give direct influence by thermal load. Further, at least one physical value related to a thermal sensing of the occupant (sensed temperature information signals) is detected. Such sensing includes outside air temperature, solar radiation intensity level, surface temperature of occupant's clothing, and a surface temperature of occupant's skin.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS (First Preferred Embodiment)

Figure 1:
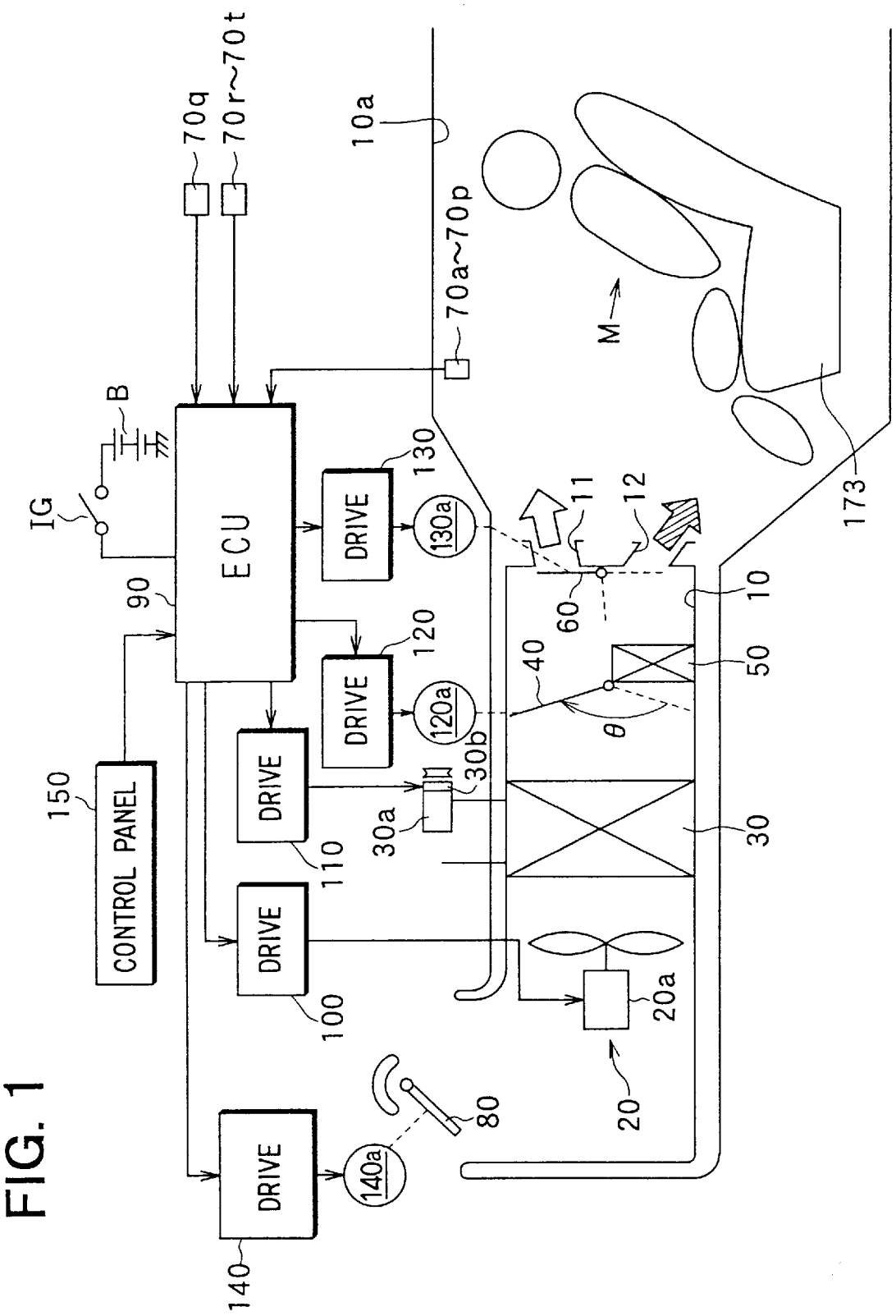
FIG. 1 is a schematic view showing a first preferred embodiment of an air conditioner for an air conditioner for a vehicle according to the present invention.

Referring to FIG. 1, an air conditioner for a vehicle according to the present invention is shown. Here, the air conditioner, mounted on a vehicle, is equipped with an air duct 10 which forms an air passage. The air duct 10 opens to the inside of a vehicle compartment 10a through a face air outlet 11 and a foot air outlet 12. Cold air is blown toward the upper body of a vehicle occupant through the face air outlet 11, and warm air is blown toward the feet of the occupant through the foot air outlet 12. Along the air passage from an air inlet to each of the air outlets 11 and 12 in the air duct 10, there is disposed an inside/outside air selector door 80, a blower 20, an evaporator (cooling-cycle heat exchanger) 30, an air mix damper 40, a heater core (heating-cycle heat exchanger) 50, and air outlet selector damper 60.

The inside/outside air selector door 80 is used for selecting outside air or inside air to be introduced into the air duct 10. The blower 20, driven by a blower motor 20a, introduces an air flow into the air duct 10 through the air inlet. The air is fed to the inside of the vehicle compartment 10a through the evaporator 30, through the air mix damper 40, through the heater core 50, through the air outlet selector damper 60, and to the face air outlet 11 or foot air outlet 12. The evaporator 30, supplied with a refrigerating-cycle refrigerant by operation of a compressor 30a, is used to cool down the airflow from the blower 20. The compressor 30a is driven by the vehicle engine through selective engagement with an electromagnetic clutch 30b.

The air mix damper 40 constitutes a temperature regulator means for adjusting a temperature of the air flow. With an actual opening θ (see FIG. 1), the air mix damper 40 regulates the quantity of cooled air fed from the evaporator 30 to the heater core 50 and the quantity of cooled air fed from the evaporator 30 to the downstream side bypassing the heater core 50. When the air mix damper 40 is positioned as indicated by the broken line (or solid line) in FIG. 1, the 10I air mix damper 40 provides a minimum opening θ min (or maximum opening θ max). The heater core 50 is supplied with engine cooling water for re-heating of the cooled air flow fed thereto.

When the air outlet selector damper 60 is set at a select position indicated by the solid line in FIG. 1 (hereinafter referred to as a first select position), a mixture of heated air from heater core 50 and cooled air bypassing heater core 50 is blown out through the foot air outlet 12. When the air outlet selector damper 60 closes foot air outlet 12 (hereinafter referred to as a second select position), the air flow mixture is blown out through the face air outlet 11. Further, when the air outlet selector damper 60 opens face and foot air outlets 11 and 12 (hereinafter referred to as a third select position), the air mixture is blown out through both the face and foot air outlets 11 and 12.

At a location on a ceiling part of the vehicle compartment 10a which is in the vicinity of an inside rear view mirror in front of an occupant (driver) M, a plurality of surface temperature sensors (non-contact sensors) 70a to 70p (sixteen surface temperature sensors in the present preferred embodiment) are provided. These sensors are capable of non-contact detection of surface temperatures of predetermined internal regions of the vehicle compartment 10a. Detecting surface temperatures of the occupant M and surrounding rear regions, the surface temperature sensors 70a to 70p generate surface temperature signals corresponding to respective regions. Each of these surface temperature sensors 70a to 70p is an infrared ray sensor designed to generate a surface temperature signal according to a change in infrared radiation due to temperature variation in an object to be checked. More specifically, each surface temperature sensor is an infrared ray sensor in which a thermopile type detecting element is used to produce an electromotive force proportional to infrared radiation that changes due to temperature variation in the object checked.

Figure 2:
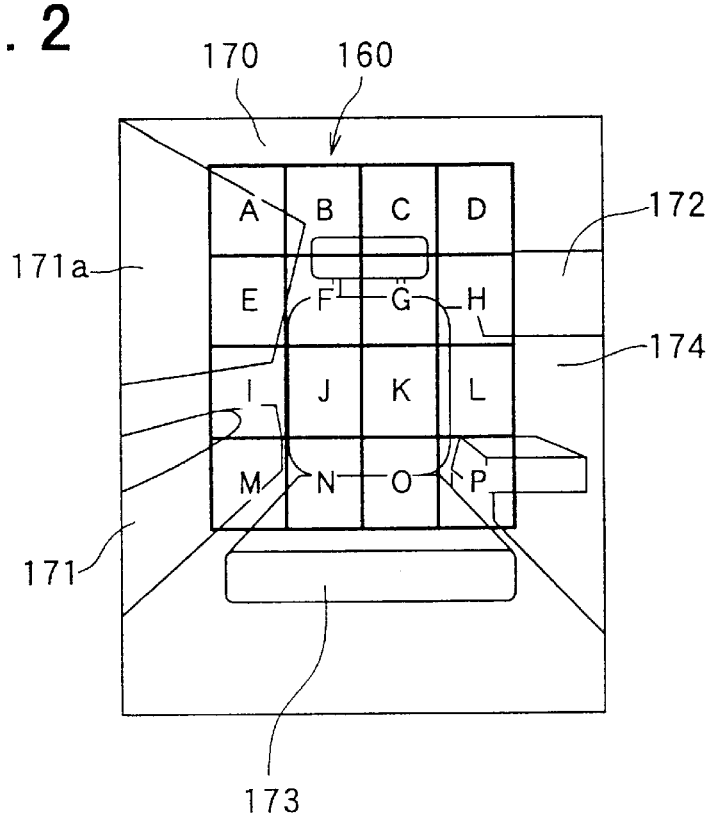
FIG. 2 is a diagrammatic view showing a temperature detection range of each surface temperature sensor indicated in FIG. 1 for an air conditioner for a vehicle according to the present invention.

The sixteen surface temperature sensors 70a to 70p are arranged in a matrix form having four columns and four rows on a single substrate. These sensors are covered with a metallic case having infrared-transparent windows disposed along four columns and four rows. Thus, as shown in FIG. 2, surface temperatures of 1st to 16th sections A to P arranged in a matrix form of four columns and four rows can be detected independently. The alphabetic suffixes "a" to "p" of the reference characters 70a to 70p assigned to the surface temperature sensors correspond to codes A to P assigned to the sixteen sections. That is, the surface temperature sensor 70a is used to detect a surface temperature of the section A, the surface temperature sensor 70b is used to detect a surface temperature of the section B, and the surface temperature sensor 70p is used to detect a surface temperature of the section P.

Figure 3:
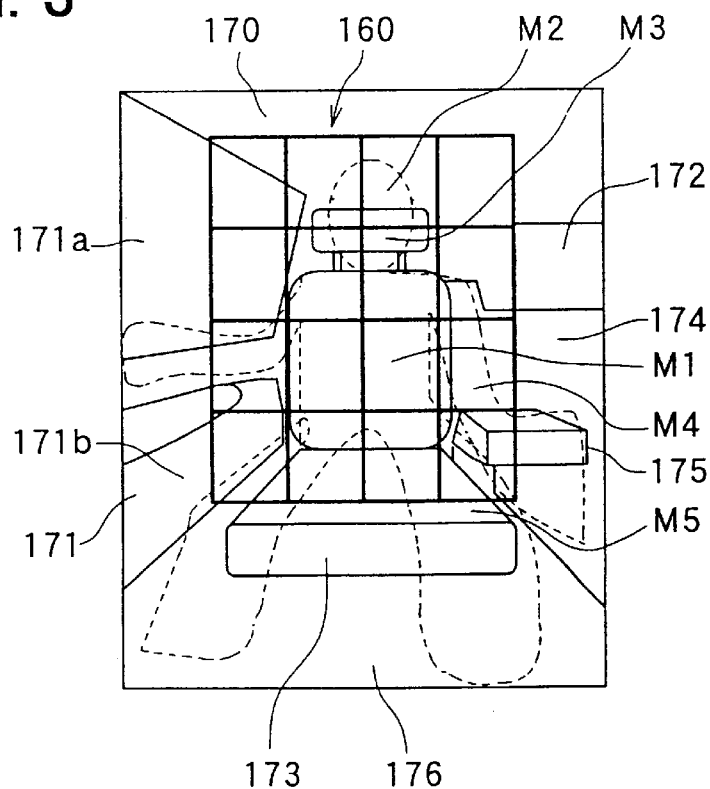
FIG. 3 is a diagrammatic view of a vehicle compartment showing a temperature detection range of each surface temperature sensor indicated in FIG. 1 for an air conditioner for a vehicle according to the present invention.

Referring to FIG. 3, a range of surface temperature detection is shown by the surface temperature sensors 70a to 70p. A detection range 160 covers the upper body (clothing part) M1 of the occupant M, the head M2, the face M3, the arm part M4, the lower body M5, a part of an internal surface of a ceiling 170, a part of an internal surface of a side glass window 171a on the front seat door 171, and a part of an internal surface of a rear glass window 172. In FIG. 3, reference numeral 173 indicates a front seat, and reference numeral 174 indicates a rear seat. The front seat 173, the rear seat 174, a console 175, a floor 176, and a side wall 171b may be included as objects to be checked in surface temperature detection by the surface temperature sensors 70a to 70p.

In the detection range 160, the internal surface of the ceiling 170 (inside-air-temperature-related region) is not directly exposed to solar radiation and it is less susceptible to heat from an external surface of the ceiling 170 since a heat insulating material is provided in the ceiling 170. Therefore, a temperature of the internal surface of the ceiling 170 varies approximately according to the temperature of the inside air. Temperatures of the internal surfaces of the side glass window 171a and the rear glass window 172 (outside-air-temperature-related regions) might vary with heat from external surfaces thereof (heat due to outside air or solar radiation). In particular, a surface temperature of the upper body M1 of the occupant M (solar-radiation-related region) may vary due to solar radiation.

Internal surface temperatures of the side glass window 171a, the rear glass window 172, and the side wall 171b of the front seat door 171 are used to estimate intrusion heat (thermal load) due to a difference between an inside air and compartment internal surface temperature. A surface temperature of a region that is actually influenced by solar radiation to incur temperature variation (e.g., clothing of the occupant M) is used for estimation of intrusion heat (thermal load) due to solar radiation into the vehicle compartment. Since surface temperatures of the occupant M (temperatures of skin and clothing) are closely related to the sensed temperature of the occupant M, these surface temperatures are used for air-conditioning control to determine the sensed temperature thereof.

The air conditioner for a vehicle of the present invention further comprises an inside air temperature sensor 70q, opening sensors 70r to 70t, and other various sensors (not shown). The inside air temperature sensor 70q detects a temperature of inside air in the vehicle compartment 10a to generate an inside air temperature signal. The opening sensors 70r to 70t detect actual angles of openings of the air mix damper 40, the air outlet selector damper 60, and the inside/outside air selector door 80 to generate respective opening-angle signals. A control panel 150 is used to generate various setting signals according to input by the occupant M for air-conditioning operation (set temperature signal, mode select signal, auto/manual select signal, etc.). The control panel 150 comprises temperature setting means for setting a temperature of inside air desired by the occupant M.

Figure 4:
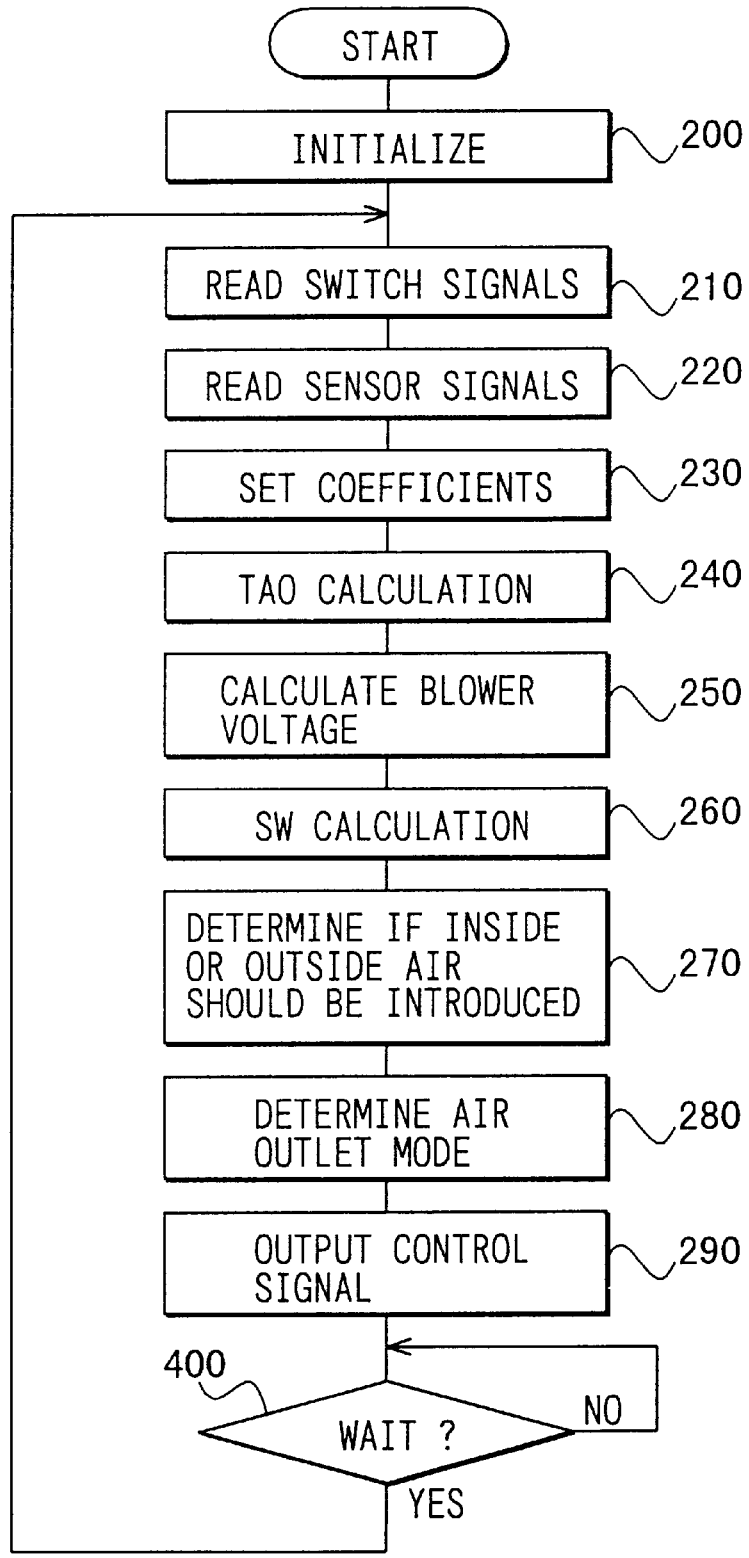
FIG. 4 is a flow chart showing air-conditioning control processing carried out by an ECU indicated in FIG. 1 for an air conditioner for a vehicle according to the present invention.

Referring to FIG. 4, a flow chart of air-conditioning control operations is shown which is carried out by an ECU 90. In program execution according to this flow chart, the ECU 90 performs arithmetic processing required for controlling drive circuits 100, 110, 120, 130 and 140, which are connected with the blower motor 20a, electromagnetic clutch 30b, three motors 120a, 130a and 140a, respectively. In this arrangement, when an ignition switch IG of the vehicle is turned on, power is supplied from a battery B to the ECU 90 for operations thereof. Thus, the ECU 90 starts execution of programs, which are prestored in a ROM of the ECU 90.

Under control of the ECU 90, the drive circuit 100 regulates a rotational speed of the blower motor 20a. The drive circuit 110, under control of the ECU 90, selectively engages the electromagnetic clutch 30b. The motor 120a is driven by the drive circuit 120 in response to a control signal from the ECU 90. That is, the motor 120a regulates an actual opening angle of air mix damper 40 through a reduction gear mechanism (not shown). The motor 130a is driven by the drive circuit 130 under control of the ECU 90. More specifically, the motor 130a selectively sets the air outlet selector damper 60 to a first to third select positions through a reduction gear mechanism (not shown). The motor 140a is driven by the drive circuit 140 under control of the ECU 90. To be more specific, the motor 140a regulates an actual opening angle of the inside/outside air selector door 80 through a reduction gear mechanism (not shown).

When the electromagnetic clutch 30b is actuated and engaged by the drive circuit in response to an output signal from the ECU 90, the compressor 30a is driven by the vehicle engine to supply a compression refrigerant to the evaporator 30. Thus, an air flow introduced by the blower 20 is cooled by the evaporator 30. Then, according to an actual angle of opening θ of the air mix damper 40, a part of the air flow thus cooled is fed to the heater core 50 for heating, and the remaining part of the air flow is directly fed to the downstream side behind the heater core 50 bypassing the heater core 50. Thus, the cooled airflow and heated airflow are mixed on the downstream side behind the heater core 50.

In the above-mentioned provision, when the ignition switch IG is turned on, the vehicle engine is started and the ECU 90 is put in an active state. Then, when a control signal is generated in the control panel 150, the ECU 90 executes the programs contained therein as shown in FIG. 4. First, at step 200, initialization processing is performed to initialize counters and flags used for execution of subsequent processing operations, and then step 210 is taken. At steps 210 and 220, the ECU 90 reads in a switch signal and various sensor signals including those from the surface temperature sensors 70a to 70p (inside air temperature, engine cooling water temperature, evaporator outlet temperature, vehicle speed, humidity, etc.). The sensor signals from the surface temperature sensors 70a to 70p are used as input signals at step 230.

Figure 5:
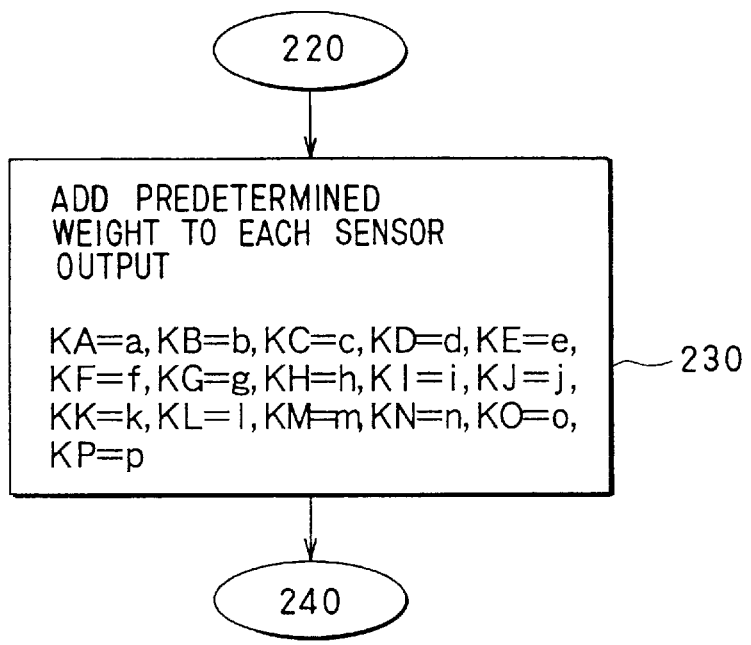
FIG. 5 is a flow chart showing control processing at step 230 of FIG. 4 for an air conditioner for a vehicle according to the present invention.

At step 230, coefficients KA to KP representing a degree of influence (weight value) on the air-conditioning system are set for the 1st to 16th sections A to P respectively as shown in FIG. 5. More specifically, a coefficient (weight) having a larger value is given to a surface temperature signal output of a section which provides a higher degree of influence on a cooling-cycle thermal load and a sensed temperature of the occupant M. In FIG. 5, KA indicates a coefficient for the 1st section A, KB is a coefficient for the 2nd section B, . . . and KP indicates a coefficient for the 16th section P, and "a" to "p" are constant values.

Figure 6:
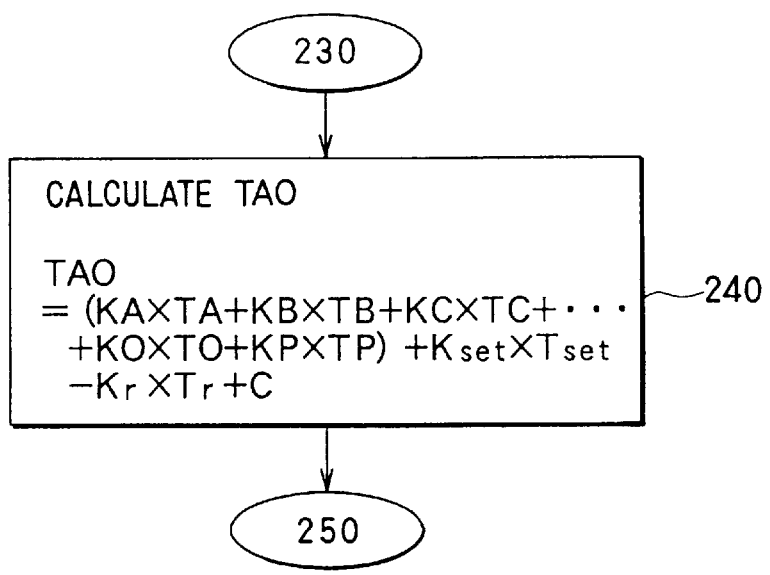
FIG. 6 is a flow chart showing control processing at step 240 indicated in FIG. 4 for an air conditioner for a vehicle according to the present invention.

Then, at step 240, based on surface temperature signal output values TA to TP, a set temperature Tset and an inside air temperature Tr, read at step 220, a target blowout air temperature TAO is calculated using the expression shown in FIG. 6. In the expression of the TAO calculation, TA indicates a surface temperature signal output value of the 1st section A, TB indicates a surface temperature signal output value of the 2nd section B, . . . and TP indicates a surface temperature signal output value of the 16th section P. Kset and Kr are coefficients, and C is a constant value.

Figure 7:
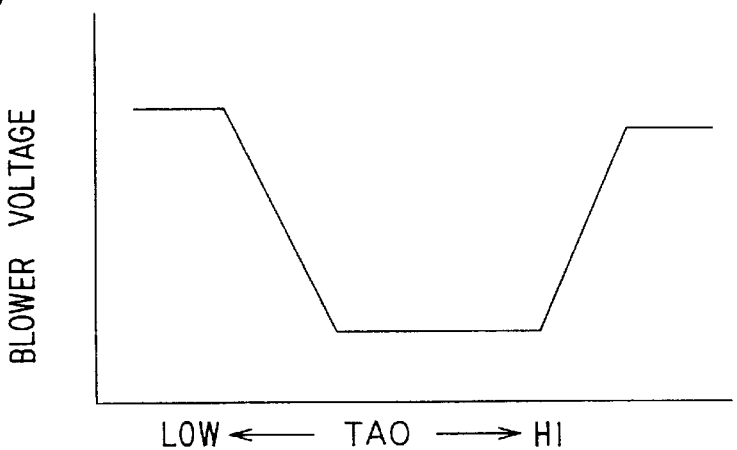
FIG. 7 is a blower control diagram for an air conditioner for a vehicle according to the present invention.
Figure 8:
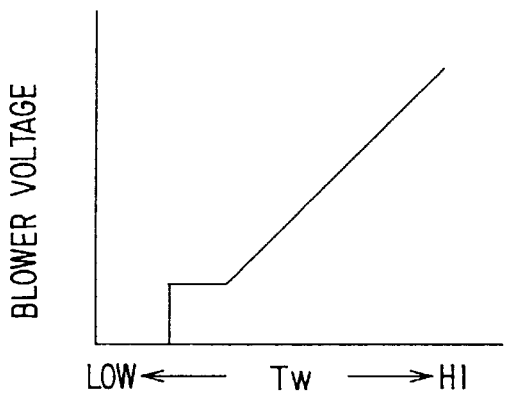
FIG. 8 is a blower control diagram for an air conditioner for a vehicle according to the present invention.

Then, at step 250, based on the target blowout air temperature TAO, a voltage applied to the blower motor 20a (first blower voltage), corresponds to a target air flow rate, is calculated according to characteristics shown in FIG. 7. Further, based on an engine cooling water temperature Tw, a second blower voltage is calculated according to characteristics shown in FIG. 8. The first and second blower voltages thus calculated are compared with each other, and a lower one of them is taken as a voltage for blower drive.

Then, at step 260, based on the target blowout air temperature TAO, engine cooling water temperature Tw, and evaporator outlet temperature Te, a target angle of opening SW of the air mix damper 40 is calculated using the expression 1 shown below. In the expression 1, α is a constant.

$$SW=[\{TAO-(Te+\alpha)\}/[Tw-(Te+\alpha)]]\times100(\%)$$

Figure 9:
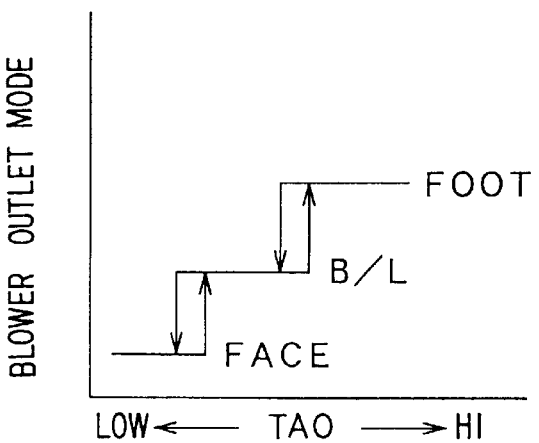
FIG. 9 is an air outlet mode control diagram for an air conditioner for a vehicle according to the present invention.

Then, at step 270, based on the target blowout air temperature TAO, it is determined whether inside air or outside air should be introduced. Then, at step 280, based on the target blowout air temperature TAO, a face mode (FACE), a bi-level mode (B/L) or a foot mode (FOOT) is determined as an air outlet mode according to characteristics shown in FIG. 9. Then, at step 290, according to the results of calculations performed at steps 250 to 280, a blower voltage control signal, air mix damper opening control signal, inside/outside air intake mode control signal, and air outlet mode control signal are output to the drive circuits 100, 120, 130, and 140 respectively. Then, step 400 is taken to determine whether a cycle time of "t" seconds has elapsed or not. In case of "NO", a wait is made at step 400. In case of "YES", a return is made to step 210.

As described above, since the present preferred embodiment detects temperatures of internal surface regions such as internal surfaces of window glass which are directly exposed to inside air and have a direct influence on thermal load, direct thermal load estimation can be accurately carried out according to the difference between an inside air temperature and each compartment internal surface temperature. Further, since the present embodiment detects surface temperatures of occupant's clothing and other regions influenced by solar radiation and directly exposed to inside air, intrusion heat (thermal load) in the vehicle compartment due to solar radiation can be estimated with high accuracy.

Further, since surface temperatures of occupant's skin (e.g., occupant's face M3) and occupant's clothing which are closely related to the sensed temperature of the occupant are detected and control values such as a target blowout air temperature TAO are calculated using the surface temperatures thus detected, proper interior temperature control meeting the occupant's sensed temperature can be performed to enhance comfort in air-conditioning.

(Second Preferred Embodiment)

Figure 10:
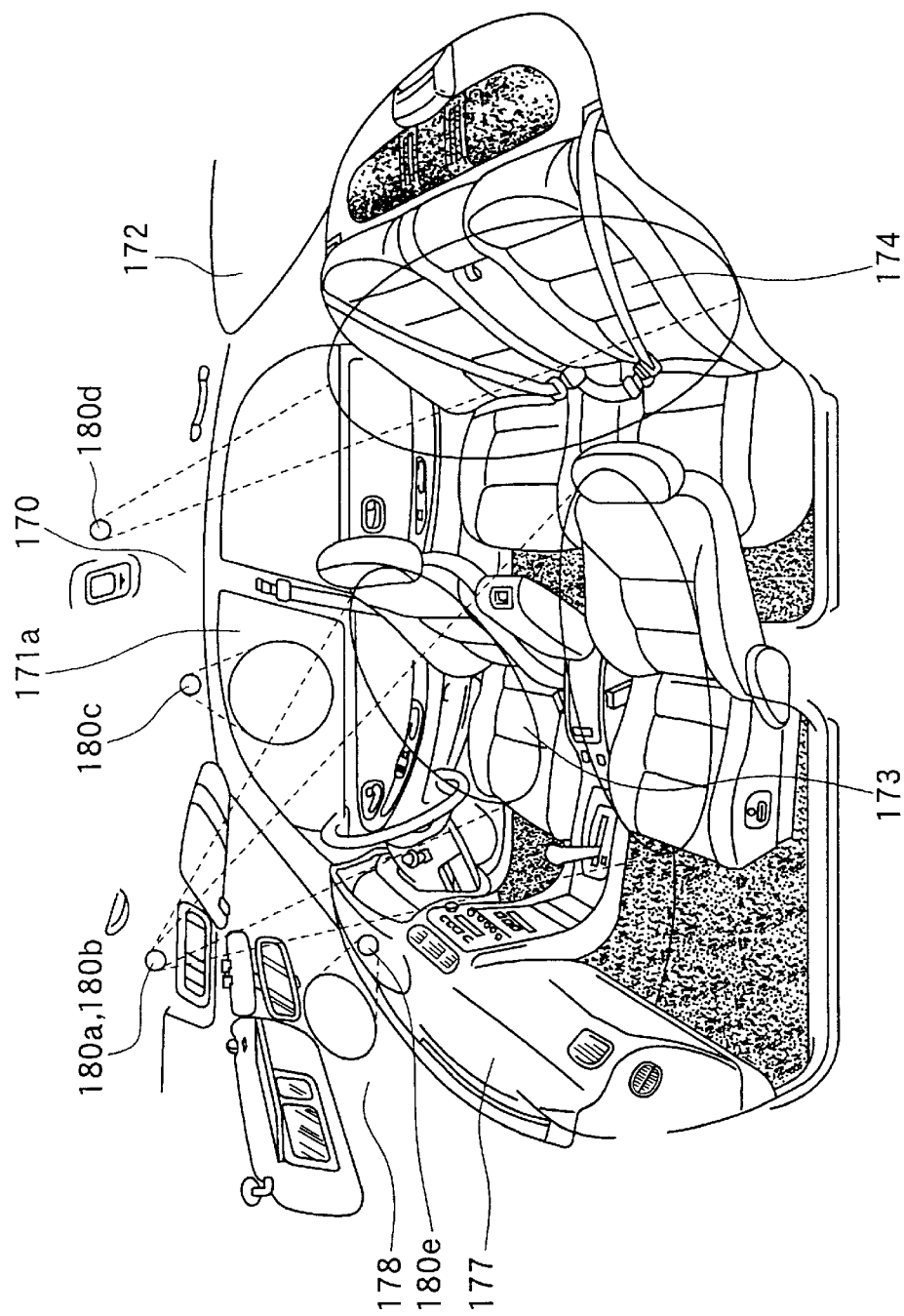
FIG. 10 is a perspective view of a vehicle compartment for an air conditioner for a vehicle according to the present invention.

FIG. 10 illustrates a second preferred embodiment of the present invention. In the first preferred embodiment, the sixteen surface temperature sensors 70a to 70p are arranged in a matrix form on the single substrate as described above. Specifically, these surface temperature sensors 70a to 70p are disposed at one location in the vehicle compartment. In contrast, in the second preferred embodiment, surface temperature sensors are separately disposed at different locations in the vehicle compartment.

More specifically, on ceiling 170, the widthwise center of the vehicle compartment proximate the front end thereof, two surface temperature sensors 180a and 180b are provided for independently detecting surface temperatures (temperatures of skin and clothing) of an occupant in the driver seat and an occupant in the front passenger seat. On the ceiling 170 above the driver seat, a surface temperature sensor 180c is provided for detecting the temperature of the internal surface of the side glass window 171a of the front seat door 171. At a location on the ceiling 170 above the rear seat 174, a surface temperature sensor 180d is provided for detecting a surface temperature of the rear seat 174. Furthermore, on the top part of an instrument panel 177, a surface temperature sensor 180e for detecting the temperature of an internal surface of a windshield 178 is provided.

Surface temperature signals of these surface temperature sensors 180a to 180e are used in the second preferred embodiment instead of those of the surface temperature sensors 70a to 70p in the first preferred embodiment. Thus, air-conditioning control can be carried out similarly to the first preferred embodiment.

Since the temperature of the top part of the instrument panel 177 varies with the amount of solar radiation, it is preferable to arrange another surface temperature sensor, not shown in FIG. 10, for detection thereof so that a signal of the surface temperature sensor can be used for estimation of intrusion heat (thermal load) due to solar radiation into the vehicle compartment.

(Third Preferred Embodiment)

In the first preferred embodiment, the coefficients KA to KP are set for each of the 1st to 16th sections A to P as described hereinbefore. Contrarily, in the third preferred embodiment shown in FIG. 11, each coefficient is set for a group of similar objects to be checked (having a similar tendency in terms of sensor output variation), an average value of each group is calculated, and the average value thus calculated is used for figuring out a target blowout air temperature TAO. Step 230 in the first preferred embodiment (FIG. 4) is modified as step 330 as shown in FIG. 11 in the third preferred embodiment.

Figure 11:
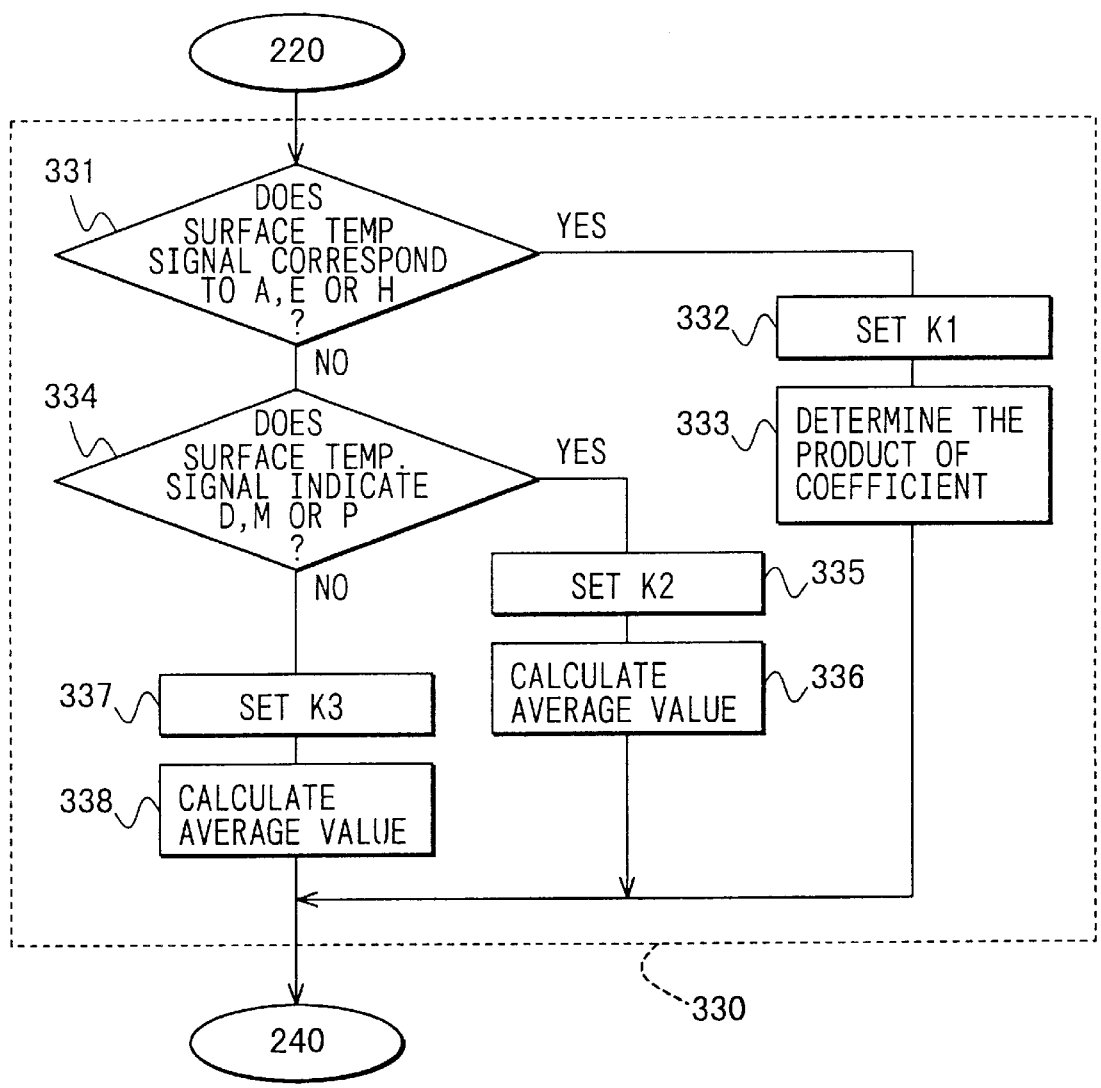
FIG. 11 is a flow chart showing air-conditioning control processing for an air conditioner for a vehicle according to the present invention.

Referring to FIG. 11, at step 331, it is determined whether a surface temperature signal indicates an output value corresponding to the section A, E or H (see FIG. 2). If "YES", step 332 sets a coefficient K1 for a surface temperature signal output value corresponding to each of the sections A, E and H. Then, at step 333, the product of the coefficient K1 and each surface temperature signal output value of the sections A, E and H is determined, and an average value is calculated. In the sections A, E and H, internal surface window glass temperatures are detected for ordinary situations. Thus, the average value determined at step 333 is used to estimate intrusion heat (thermal load) due to differences between inside air temperature and compartment internal surface temperature.

If step 331 yields "NO", step 334 determines whether a surface temperature signal indicates an output value corresponding to the section D, M or P. In case of "YES", step 335 sets a coefficient K2 for a surface temperature signal output value corresponding to each of the sections D, M and P. Then, at step 336, the product of the coefficient K2 and each surface temperature signal output value of the sections D, M and P is determined, and an average value is calculated. In the sections D, M and P, temperatures of regions less subject to solar radiation are detected for ordinary situations.

If step 334 yields "NO", step 337 sets a coefficient K3 for a surface temperature signal output value corresponding to each of the remaining sections B, C, F, G, I, J, K, L, N and O. Then, at step 338, an average value is calculated. In the sections B, C, F, G, I, J, K, L, N and O, surface temperatures of an occupant's skin and clothing are detected. Then, based on the average values determined for each group of sections at steps 333, 336 and 338, a target blowout air temperature TAO is calculated at step 240.

(Fourth Preferred Embodiment)

Figure 12:
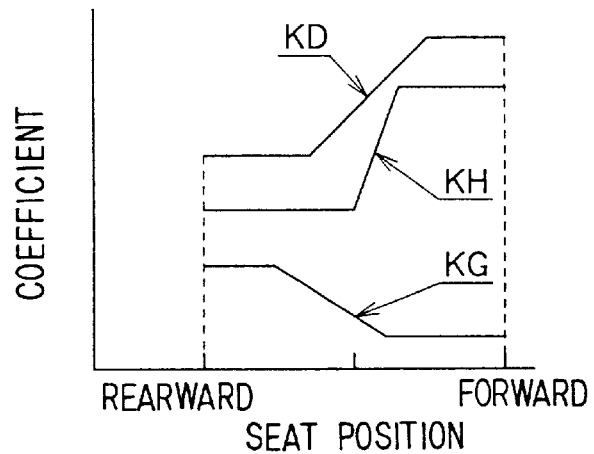
FIG. 12 is a diagram for an air conditioner for a vehicle according to the present invention.

In a fourth preferred embodiment of the present invention, shown in FIG. 12, each of the coefficients KA to KP for the 1st to 16th sections A to P in the first preferred embodiment is changed according to the position of the front seat 173. When the front seat 173 is shifted frontward/backward or upward/downward, the objects checked by the surface temperature sensors 70a to 70p may be altered. For example, if the front seat 173 in FIG. 3 is shifted toward the front of the vehicle compartment, the surface temperature detection range of the occupant increases and the surface temperature detection range of the remaining surrounding regions decreases. Therefore, in the fourth preferred embodiment, as the front seat 173 is shifted toward the front of the vehicle compartment, the coefficient KG for where the surface temperature of the occupant is detected is decreased as shown in FIG. 12. On the other hand, the coefficient KD, for section D where the temperature of the internal surface of the ceiling is detected, and the coefficient KH, for the section H where a temperature of the internal surface of the glass window is detected, are increased. Accordingly, as each section to be checked is altered due to change in position of the front seat 173, each coefficient KA to KP for sections A to P is changed. Thus, regardless of the position of the front seat 173, thermal load is accurately estimated.

In a modified arrangement, target blowout air temperature or a blower voltage is compensated for according to the position of the seat. Preferably, each coefficient KA to KP for the sections A to P according to a factor varying with an occupant's physique, such as a steering angle, inside rear view mirror angle, or wing mirror angle.

(Fifth Preferred Embodiment)

Figure 13:
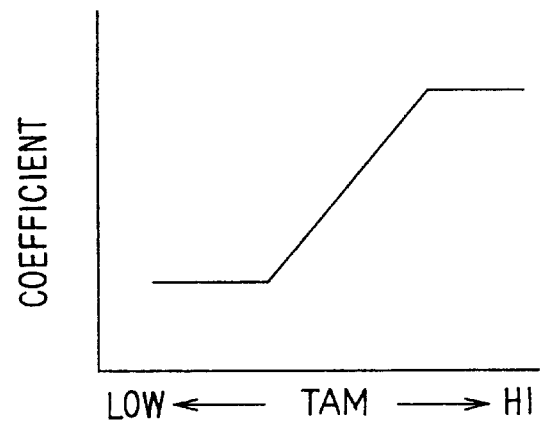
FIG. 13 is a diagram for an air conditioner for a vehicle according to the present invention.

In a fifth preferred embodiment of the present invention shown in FIG. 13, an outside air temperature sensor for detecting a temperature of outside air is added to the arrangement of the first preferred embodiment. As shown in FIG. 13, each coefficient KA to KP for the sections A to P is increased with an increase in outside air temperature. In a modification, each coefficient KA to KP for the sections A to P may be changed according to a surface temperature of the occupant or a compartment internal surface temperature.

(Sixth Preferred Embodiment)

Figure 14:
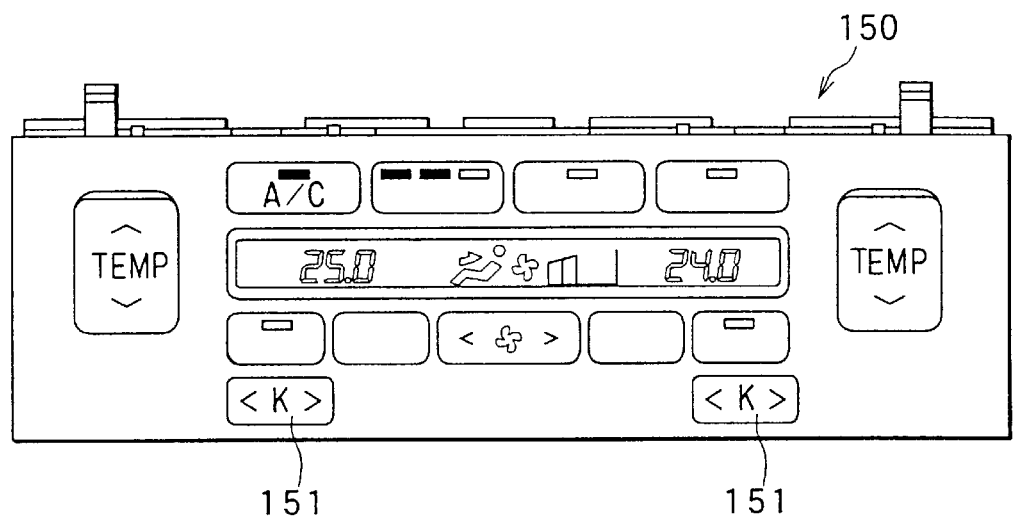
FIG. 14 is a front view of a control panel for an air conditioner for a vehicle according to the present invention.

In a sixth preferred embodiment of the present invention, shown in FIG. 14, the occupant can change at least one of the coefficients KA to KP for the sections A to P. To accomplish this, control panel 150 has a coefficient change buttons 151 for changing at least one of the coefficients KA to KP. Using the coefficient change buttons 151, the occupant selects "warmer", "ordinary" or "cooler", according to his or her preference. Then, in response, the ECU 90 changes at least one of the coefficients KA to KP.

(Seventh Preferred Embodiment)

Figure 15:
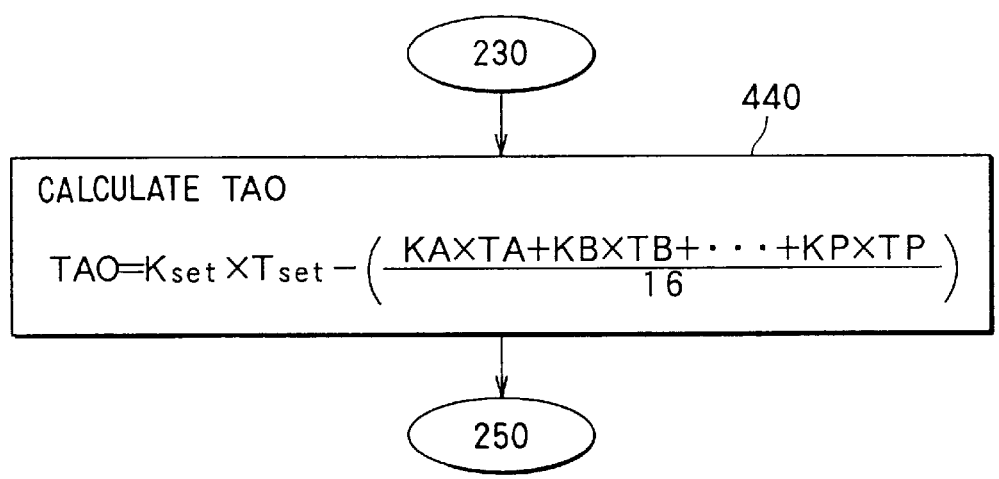
FIG. 15 is a flow chart showing air-conditioning control processing for an air conditioner for a vehicle according to the present invention.

In a seventh preferred embodiment of the present invention, as shown in FIG. 15, the inside air temperature sensor 70q in the first preferred embodiment is eliminated, and step 240 (FIG. 4) in the first preferred embodiment is modified to provide step 440 shown in FIG. 15.

Since the seats 173, 174 and the ceiling 170 are not likely to be affected by outside air temperature and solar radiation, surface temperatures thereon vary approximately according to inside air temperature. Therefore, in the seventh preferred embodiment, a surface temperature sensor for detecting a surface temperature of a section corresponding to the seat 173, 174 or the ceiling 170 is utilized as an inside air temperature sensor, and a signal output value thereof is used as an equivalent inside temperature in calculation of a target blowout air temperature TAO. Based on surface temperature signal output values TA to TP and a set temperature Tset, a target blowout air temperature TAO is calculated as shown in FIG. 15.

(Eighth Preferred Embodiment)

Figure 16:
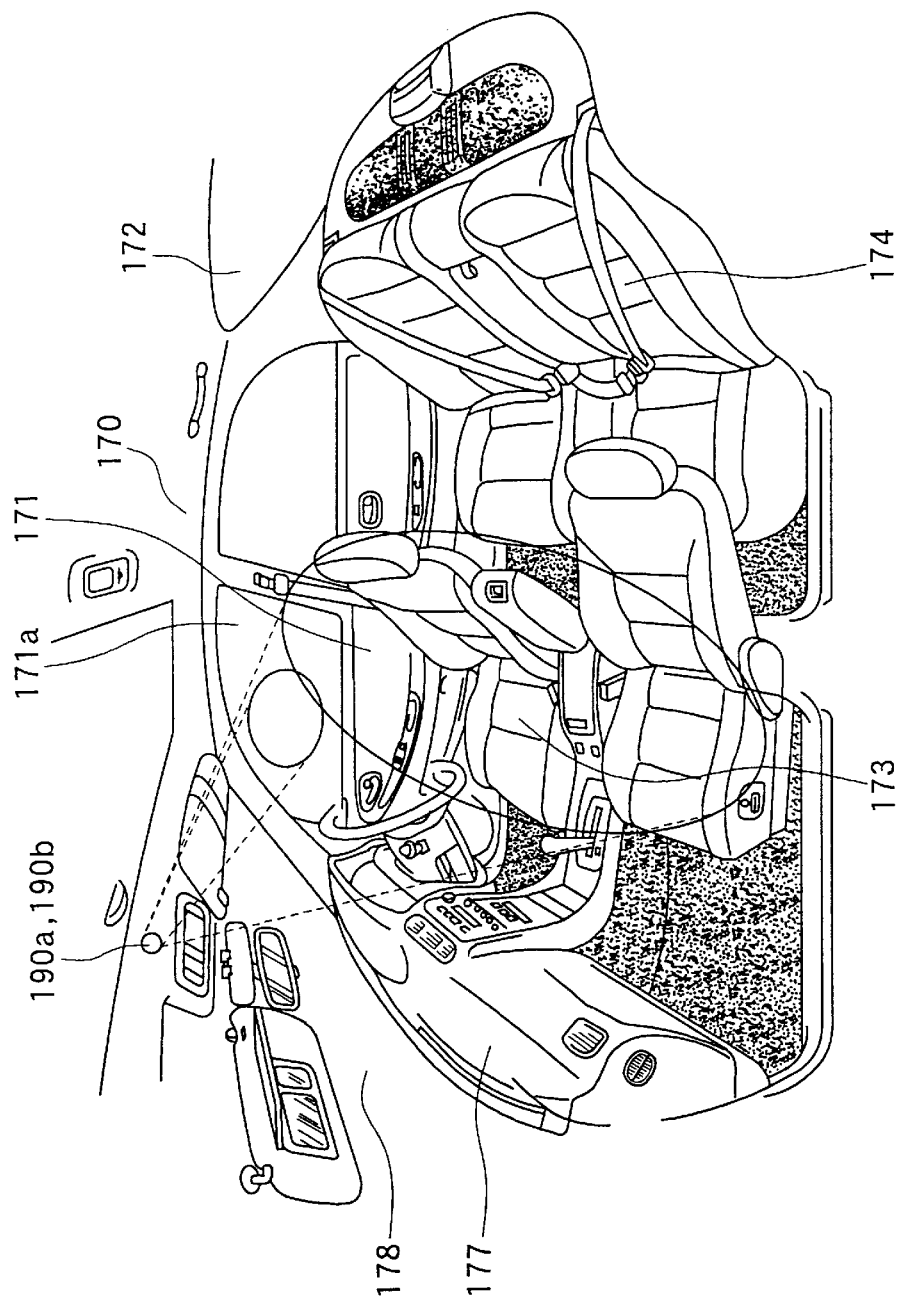
FIG. 16 is a perspective view of a vehicle compartment in an eighth preferred embodiment of the present invention.

An eighth preferred embodiment of the present invention is shown in FIGS. 16 to 24. Here, as shown in FIG. 16, two surface temperature sensors 190a and 190b for detecting compartment internal surface temperatures are provided on the ceiling 170 which is the widthwise center of the compartment near the front end thereof.

The surface temperature sensor 190a is used detect temperature along a wide range (visual-field range) in the compartment. More specifically, the surface temperature sensor 190a detects ceiling 170 and front seat 173 surface temperatures that vary according to inside air temperature (inside-air-temperature-related regions), side glass window internal surface temperature (may vary with outside air temperature or outside-air-temperature-related region), and skin and clothing surface temperatures of occupants in the front seats (may vary with solar radiation solar-radiation-related regions). According to the surface temperatures of these regions, the surface temperature sensor 190a outputs a signal representing a compartment internal surface temperature Tir. Since the surface temperature sensor 190a detects the surface temperatures of regions directly influencing thermal load, thermal load estimation can be performed with high accuracy.

Figure 17:
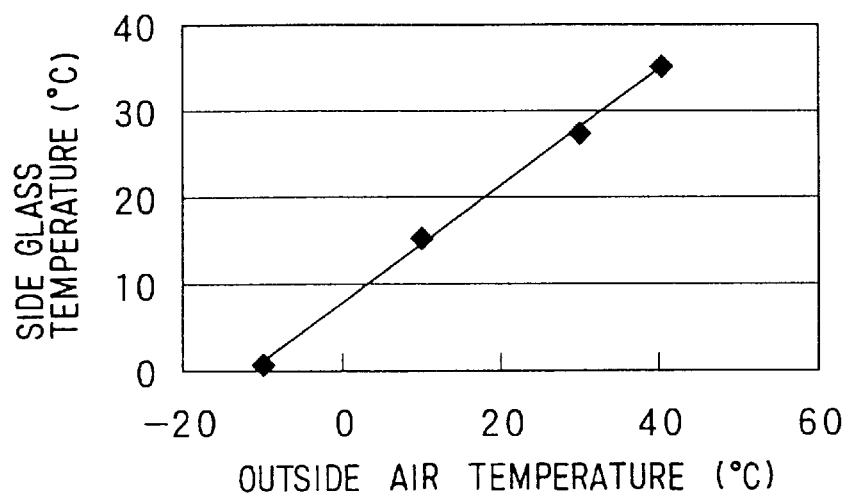
FIG. 17 is a graphical view showing a relationship between an internal surface temperature of window glass and an outside air temperature for an air conditioner for a vehicle according to the present invention.

The surface temperature sensor 190b (sensed temperature information detecting means) detects a physical value relating to the occupant's sensed temperature. In this embodiment, the surface temperature sensor 190b detects the side glass window internal surface temperature. FIG. 17 shows the relationship between the side glass window internal surface temperature and outside air temperature. Since a correlation exists between the temperature of the internal surface and the outside air temperature as shown in FIG. 17, an outside air temperature for use in attaining sensed temperature information can be estimated from the temperature of the internal surface of the side glass window 171a. FIG. 17 presents a graph plotted under test conditions of a constant inside air temperature of 25° C., no solar radiation, and a vehicle speed of 40 km/h.

Figure 18:
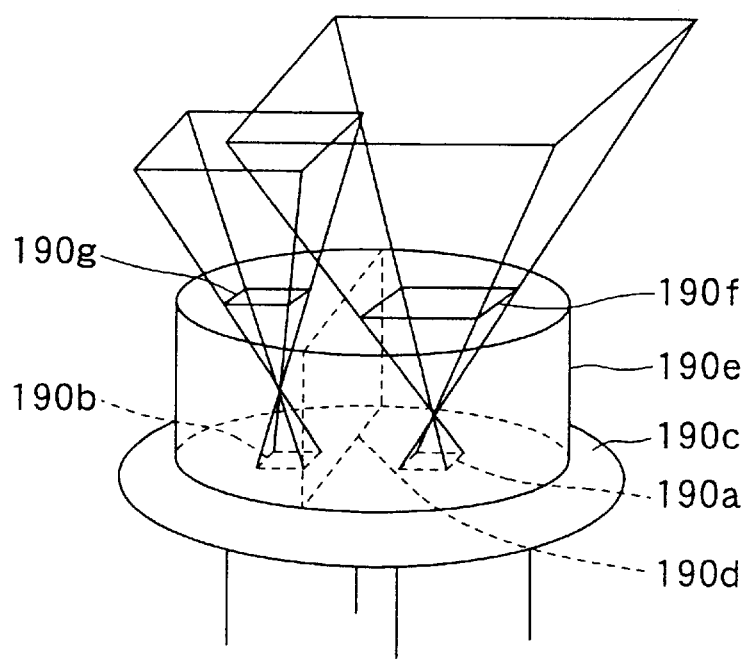
FIG. 18 is a perspective view showing a structure of each sensor indicated in FIG. 16 for an air conditioner for a vehicle according to the present invention.
Figure 19:
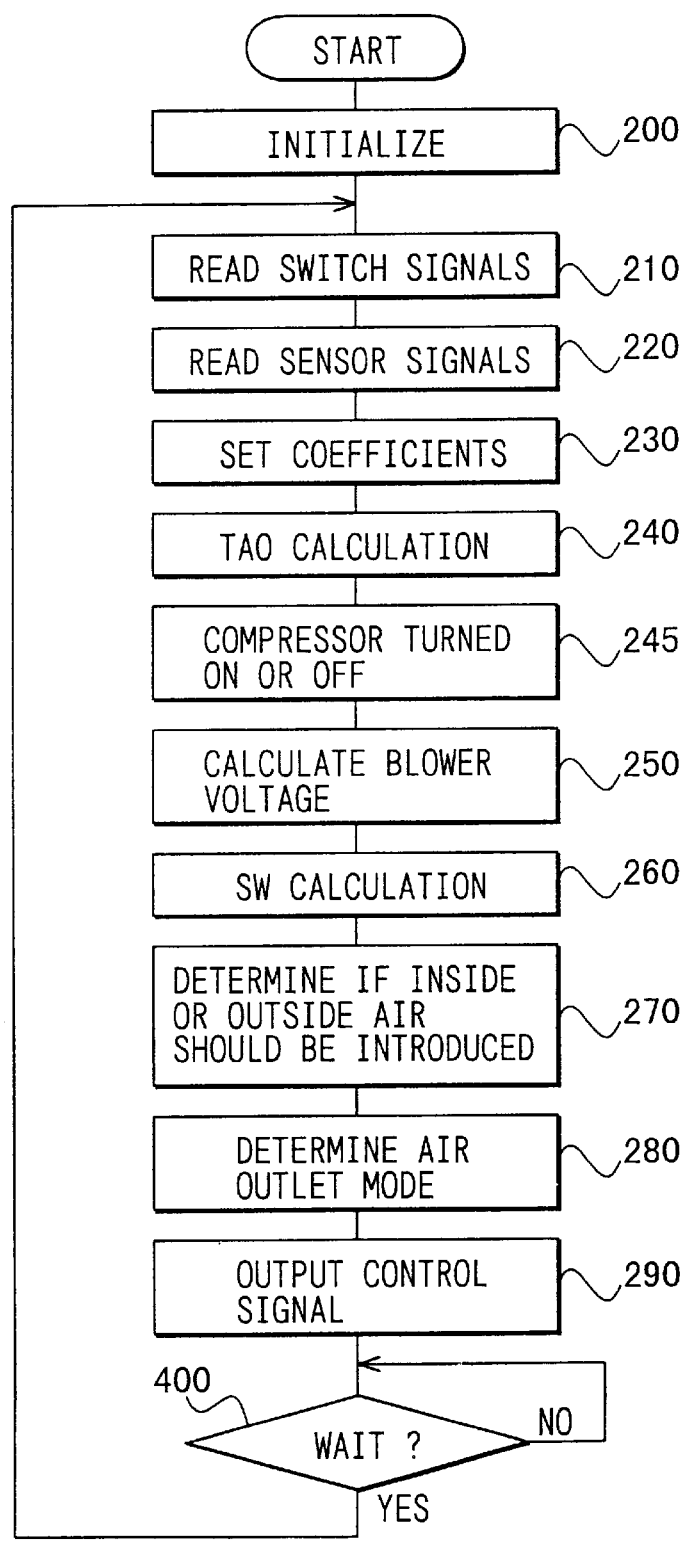
FIG. 19 is a flow chart showing air-conditioning control processing for an air conditioner for a vehicle according to the present invention.

FIG. 18 shows a unit having surface temperature sensors 190a and 190b. These sensors are mounted on a substrate 190c and covered with a cup-shaped metallic case 190e having a partition board 190d for dividing the inside into two parts. On the bottom of case 190e, two quadrangular windows 190f and 190g are formed. A temperature detection range is set by changing the size of each window 190f and 190g. Air-conditioning control operation is described below with reference to the flow chart shown in FIG. 19. Contrasted with the first preferred embodiment, steps 230 and 240 are modified and step 245 is added in the eighth preferred embodiment. Since processing in the remaining steps is the same as in the first embodiment, the following explains steps 230, 240 and 245 in detail while omitting the remaining steps.

Figure 20:
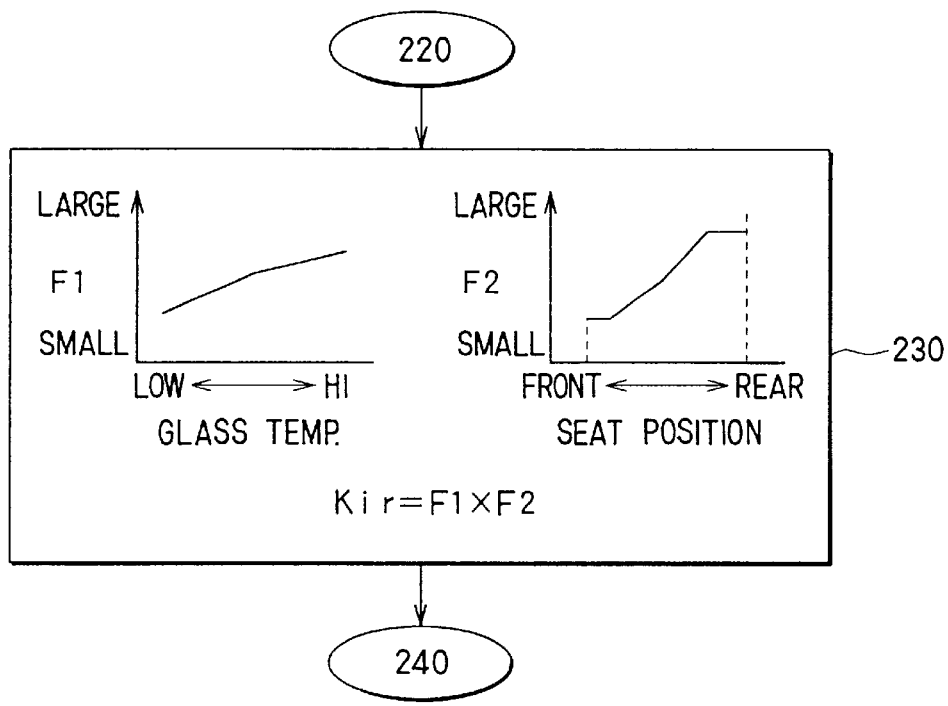
FIG. 20 is a flow chart showing control processing carried out at step 230 in FIG. 8 for an air conditioner for a vehicle according to the present invention.

At step 230, a coefficient Kir for a compartment internal surface temperature Tir is calculated. As shown in FIG. 20, a first variable F1 is determined using the side glass window internal surface temperature (internal glass surface temperature) detected by the surface temperature sensor 190b, and a second variable F2 is determined by the position of front seat 173 (seat position). Then, the variables F1 and F2 are multiplied to attain the coefficient Kir.

Figure 21:
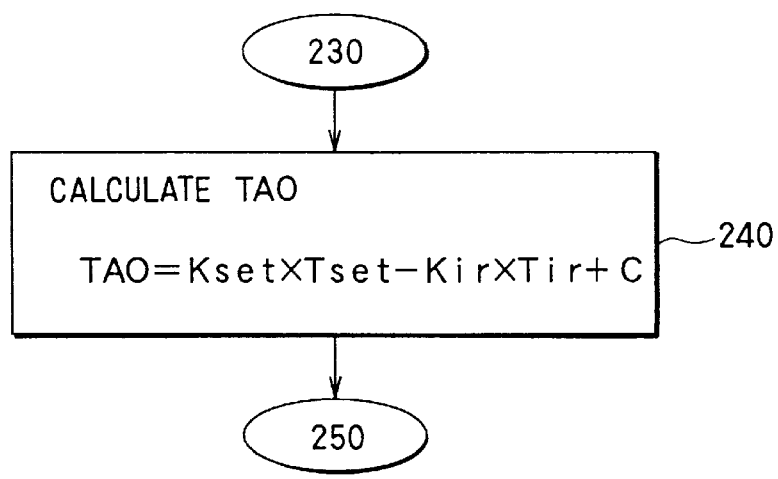
FIG. 21 is a flow chart showing control processing carried out at step 240 in FIG. 8 for an air conditioner for a vehicle according to the present invention.
Figure 22:
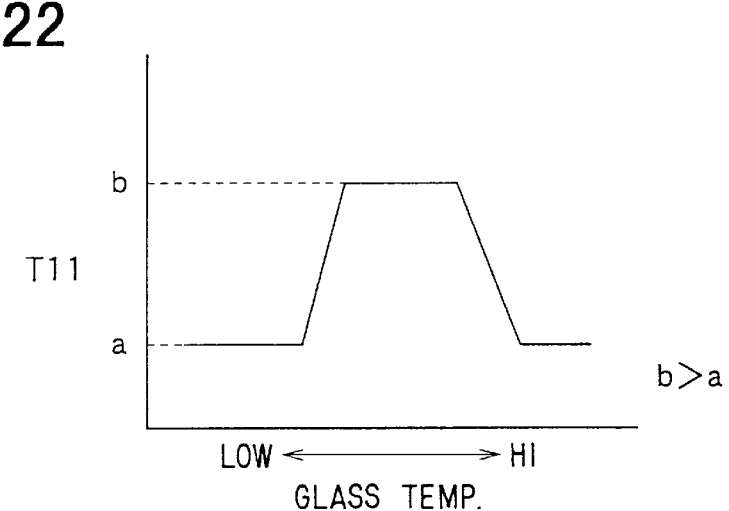
FIG. 22 is a control diagram for a first stop control temperature for an air conditioner for a vehicle according to the present invention.
Figure 23:
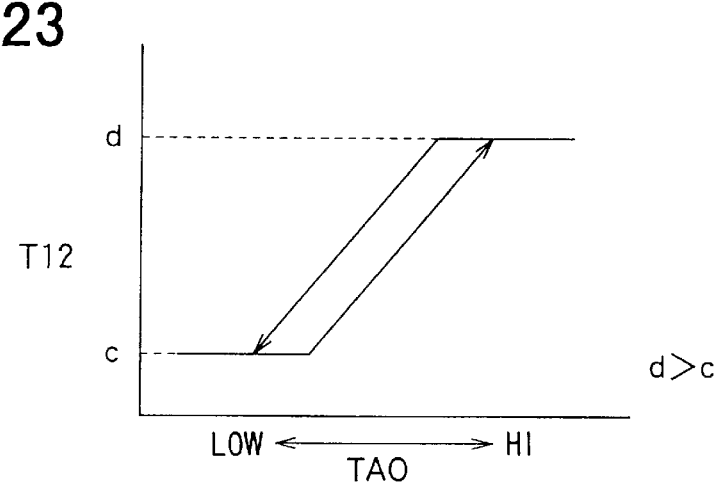
FIG. 23 is a control characteristic diagram of a second stop control temperature.
Figure 24:
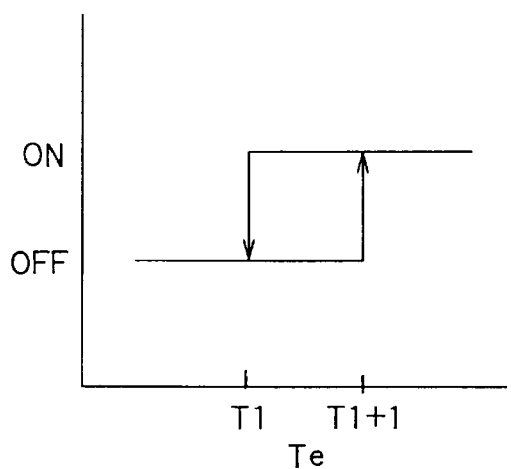
FIG. 24 is a compressor control characteristic diagram.

Then, at step 240, based on a set temperature Tset, coefficient Kir and compartment internal surface temperature Tir, a target blowout air temperature TAO is calculated using the expression shown in FIG. 21. In the summer season, when an internal glass surface temperature is high (i.e. outside air temperature is high), the first variable F1 increases to set a lower target blowout air temperature TAO. Contrarily, in winter, when the internal glass surface temperature is low (i.e. outside air temperature is low), the first variable F1 decreases to set a higher target blowout air temperature TAO. Thus, interior temperature control is carried out to provide cooler inside air in the summer season and warmer inside air in the winter season.

Further, when an occupant's seat position is shifted frontward, the area ratio of the occupant in the temperature detection range (visual-field range) of the surface temperature sensor 190b increases, causing a relatively higher level of compartment internal surface temperature Tir output from the surface temperature sensor 190b. As a result, the target blowout air temperature TAO drops below an optimum level. To circumvent this condition, the second variable F2 is decreased when the front seat 173 is shifted frontward, and the second variable F2 is increased when the front seat 173 is shifted rearward. By compensating for compartment internal surface temperature Tir in this manner, a target blowout air temperature TAO can be kept constant regardless of the positioning of the front seat 173.

For seat position detection, it is also preferable to use a signal output from a potentiometer positioned on the seat. Alternatively, an ON time of a power seat control switch is stored in the ECU memory and a seat position is estimated using data regarding the ON time thereof. At step 245, a first stop control temperature T11 is determined according to a characteristic diagram (map) shown in FIG. 22, and a second stop control temperature T12 is determined according to a characteristic diagram (map) shown in FIG. 23. The first and second stop control temperatures T11 and T12 are compared with each other, and the lower is used as a stop control temperature T1. Based on the stop control temperature T1, an ON-OFF timing sequence for compressor 30a is determined according to a characteristic diagram (map) shown in FIG. 24. More specifically, the compressor 30a is turned off when an evaporator outlet temperature Te is below the stop control temperature T1, and the compressor 30a is tuned on when the evaporator outlet temperature Te exceeds a startup control temperature (T1+1° C.).

While the surface temperature sensor 190b is used for detecting the side glass window internal surface temperature (outside-air-temperature-related region) in the present exemplary embodiment, sensor 190b can be used instead to detect the windshield 178 or rear glass window 172 internal surface temperature. Further, the surface temperature sensor 190a can be used to detect the surface temperature in a range covering only one of the front seats. Alternatively, the temperature detection range (visual-field range) of the surface temperature sensor 190a may be extended to cover the rear seat or an occupant therein. Still further, an outside air temperature sensor such as a thermistor equipped on the outside of the compartment may be used instead of the surface temperature sensor 190b. According to an outside temperature detected by the outside air temperature sensor, the first variable F1 is determined for attaining sensed temperature information. Thus, as in the present embodiment, it is possible to carry out proper interior temperature control meeting a sensed temperature of the occupant. Furthermore, as physical values related to the sensed temperature of the occupant (sensed temperature information), a solar radiation intensity level, a surface temperature of occupant's clothing, a surface temperature of occupant's skin, a surface temperature of the ceiling, etc. are all applicable in addition to an outside air temperature. These physical values may be used individually or in combination in calculation for air-conditioning control.

(Ninth Preferred Embodiment)

In a ninth embodiment, the air-conditioning control amount is increased locally at such a part of a occupant M on which solar radiation impinges locally, so that the occupant May feel more comfortable. In this embodiment, although constructed similarly as the first embodiment, a center face blowout outlet is provided at the widthwise central part in a vehicle, and side face blowout outlets are provided at both widthwise ends in the vehicle. Those blowout grilles of those face blowout outlets are electrically driven by electric motors, for instance, in such a manner that the electric motors are driven by the ECU 90 (see FIG. 1) to automatically regulate the air blowout direction.

Figure 25:
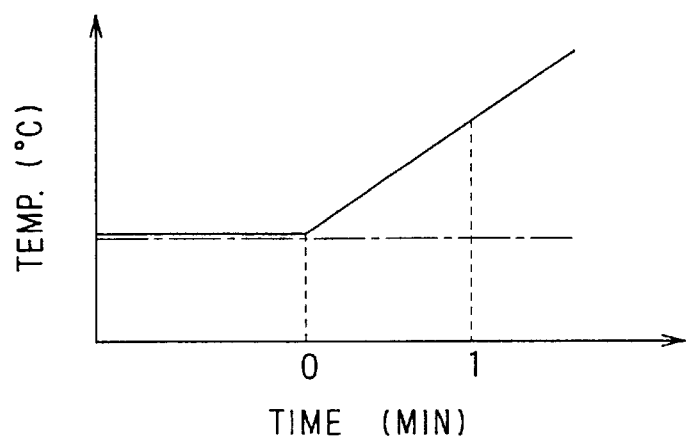
FIG. 25 is a temperature characteristic diagram showing an operation of a ninth embodiment of an air conditioner for a vehicle according the present invention.

FIG. 25 shows a temperature detected by the surface temperature sensors 70a to 70p (FIG. 1). When the solar radiation impinges only on the upper body (clothing part) M1 of the occupant M, for instance, the temperature at the upper body M1 rises as indicated by a solid line as time passes from a time point (time 0) when the solar radiation starts impinging. On the other hand, temperature at parts of the occupant M other than the upper body remains the same as indicated by a dot-and-chain line. In this instance, the occupant M feels its hot locally at the upper body.

In case that the temperature changes as shown in FIG. 25, the ECU 90 determines the upper body M1 where the temperature rise rate per unit time to be a specific part and increases a cooling ability for the specific part. Specifically, the blowout grille is driven by the electric motor to direct the blowout air towards the upper body M1. It is preferred that the amount of blowout air is increased and/or the temperature of the blowout air is lowered. Thus, the cooling ability for the upper body M1 can be raised more than that for the parts other than the upper body M1.

When a vehicle travels at high speeds in winter (low outside temperature), the window glass temperature remarkably falls below the vehicle compartment temperature. Thus, the temperature of the occupant M at the window glass side falls due to radiation. In this instance, the ECU 90 determines the part (shoulder and arm at the window glass side) where the temperature fall rate per unit time is more than a predetermined reference to be a specific part, and raises the heating ability for such a specific part. For instance, the amount of warmed air from the side face blowout outlet is increased. The temperature of the blowout air may be raised as well. Thus, the shoulder and arm at the window glass side at which the occupant M feels cold can be warmed, while restricting excessive warming at the other parts at which the occupant M does not feel cold.

In this embodiment, the specific part may be determined to be a part where a difference of temperature relative to a part of small temperature change rate is more than a predetermined reference. Further, in place of controlling the amount of air-conditioning (cooling or heating ability), blowout modes may be changed over. For instance, when the solar radiation impinges on a head part M2 of the occupant M under a foot-mode heating condition, the blowout outlet mode may be changed over to the face mode in addition to lowering the temperature of the blowout air.

(Tenth Embodiment)

Figure 26:
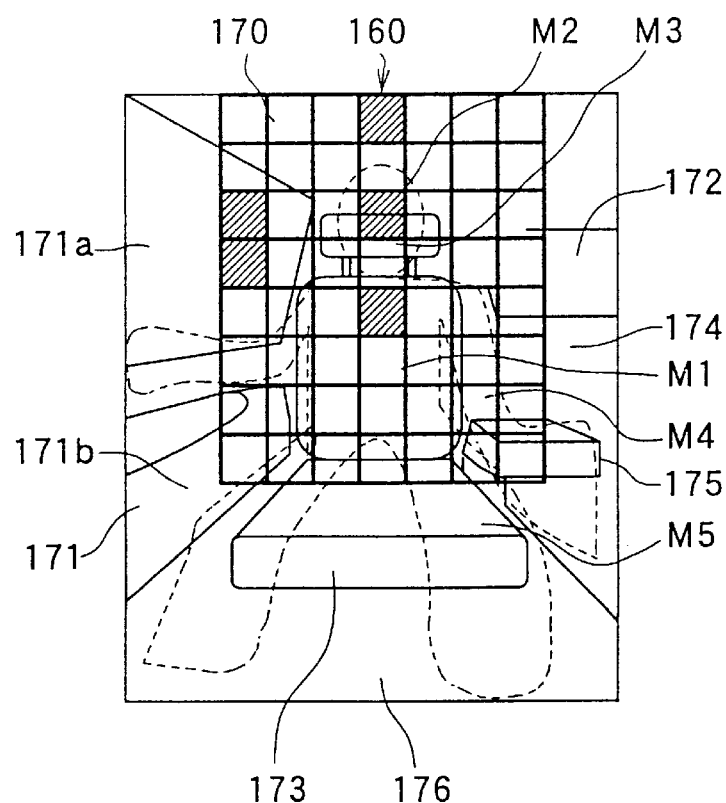
FIG. 26 is a diagrammatic view showing a temperature detection range of a surface temperature sensor of a tenth embodiment of an air conditioner for a vehicle according to the present invention.
Figure 27:
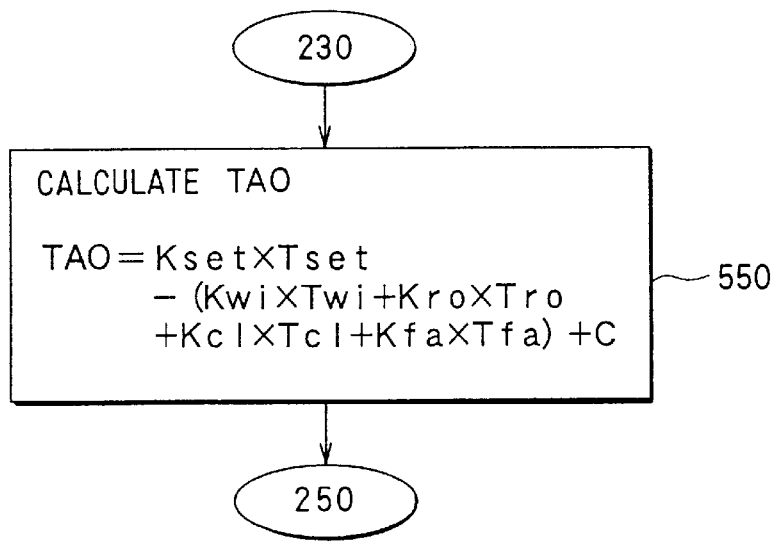
FIG. 27 is a flow chart showing air-conditioning control processing of the tenth embodiment of an air conditioner for a vehicle according to the present invention.

In a tenth embodiment shown in FIGS. 26 and 27, the inside air temperature sensor 70q in the first embodiment is eliminated, and the thermal load is calculated by using only the signals of the surface temperature sensors. In connection with the elimination of the inside air temperature sensor 70q, the calculation of the target blowout air temperature TAO executed at step 240 (FIG. 4) is changed to step 550 as shown in FIG. 27.

FIG. 26 shows a detection range 160 of the surface temperature sensors. In this embodiment, surface temperature signals of four parts shown with hatched lines in FIG. 26 are used. Specifically, the surface temperature (window temperature Twi) at the inside wall surface of the side glass 171a of the front door, the surface temperature (ceiling temperature Tro) at the inside wall surface of the ceiling 170, the surface temperature (cloting temperature Tc1) at the upper body M1 of the occupant (driver), and the surface temperature (face temperature Tfa) of the face part M3 of the passenger M.

The target blowout air temperature TAO is calculated as shown in FIG. 27. In FIG. 27, Kwi, Kro, Kc1 and Kfa are coefficients. The window temperature Twi, the ceiling temperature Tro, and the clothing temperature Tc1 are likely to change with the outside temperature and solar radiation, the inside air temperature, and the strength of the solar radiation, respectively. Therefore, the thermal load is calculated as Kwi×Twi+Kro×Tro+Kcl×Tc1. According to experiments, it was ascertained that the desirable compartment temperature control can be attained by setting Kwi=0.5 to 2, Kro=1 to 5 and Kcl=2 to 5, even when the thermal load changes.

According to this embodiment, the thermal load can be calculated by using only the signal of the surface temperature sensor without using the inside air temperature sensor, the outside air temperature sensor and the solar radiation sensor. Further, the air-conditioning control can be effected with the use of corrective term of the face temperature Tfa to match the occupant's sense of temperature.

(Eleventh Preferred Embodiment)

Figure 28:
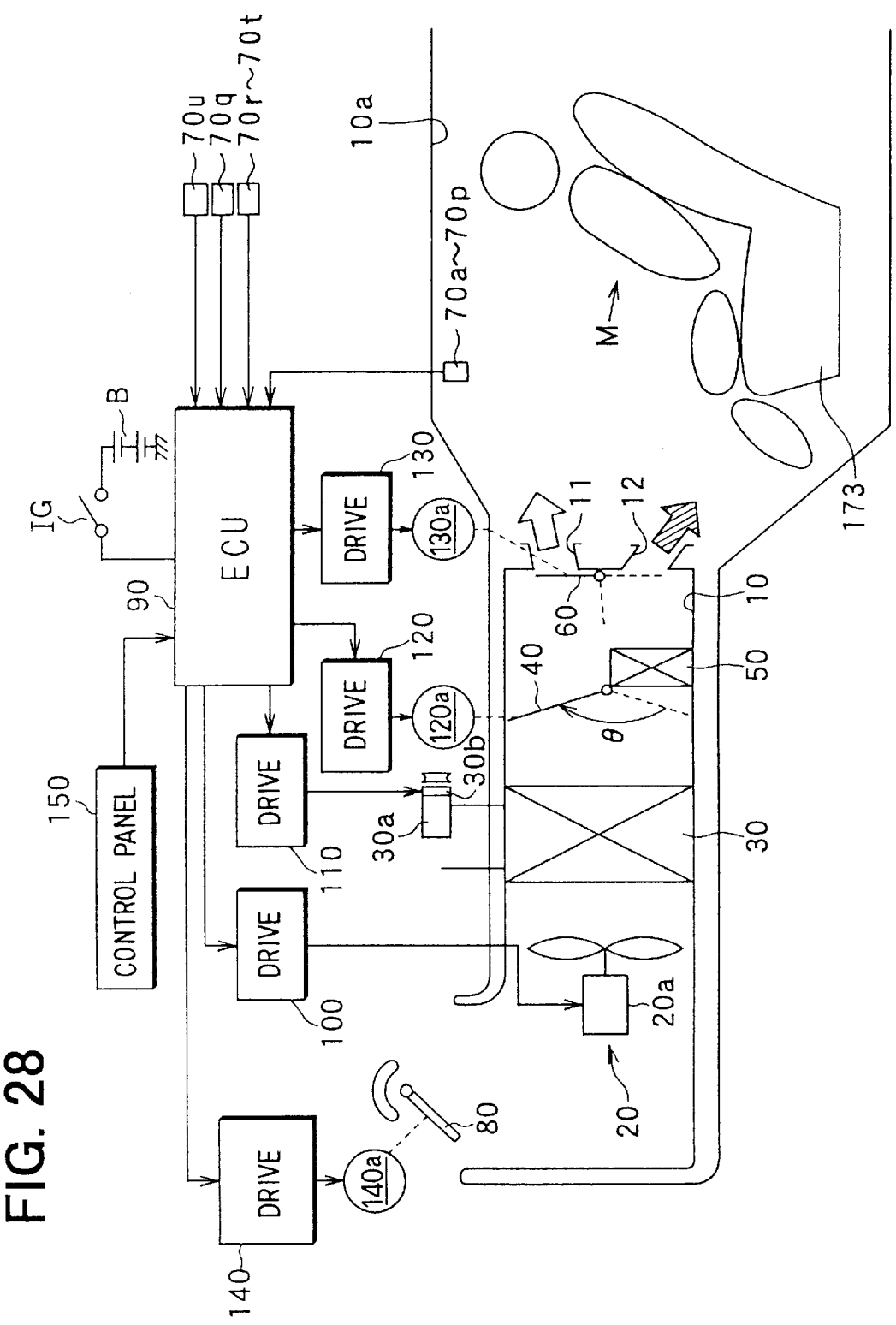
FIG. 28 is a schematic view showing an eleventh preferred embodiment of an air conditioner for an air conditioner for a vehicle according to the present invention.

In an eleventh embodiment, the air-conditioning control amount is varied based on whether the solar radiation is impinging on the occupant M. In this embodiment, as shown in FIG. 28, a solar radiation sensor 70u is provided in addition to the first embodiment shown in FIG. 1. The solar radiation condition is determined to be one of the following three cases (1) to (3) from the output signals of the solar radiation sensor 70u and the surface temperature sensors.

(1) No solar radiation

When the solar radiation detected by the solar radiation sensor 70u is less than a predetermined reference, the condition is determined to be "no solar radiation."

(2) Indirect solar radiation

Figure 29:
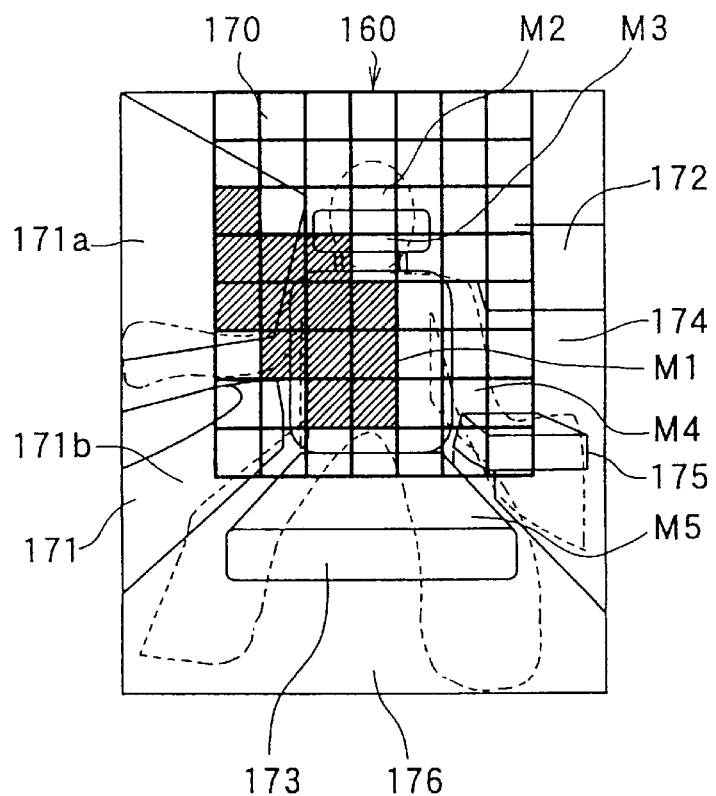
FIG. 29 is a diagrammatic view showing a temperature detection range of a surface temperature sensor of FIG. 28.

When the solar radiation detected by the solar radiation sensor 70u is more than the predetermined reference but the solar radiation is impinging on the occupant M only indirectly, the condition is determined to be "indirect solar radiation". For instance, when the sun is right above the vehicle and the solar radiation does not impinge on the upper body M1 of the occupant M, for vehicle, the temperature over the entire detection areas 160 of the surface temperature sensors rises. In this instance, the temperature of the detection areas 160 of the surface temperature sensors becomes substantially uniform except for the face area M3 shown in FIG. 29. Thus, the indirect solar radiation condition can be detected when the difference among temperatures of the detection areas 160 is small.

(3) Direct solar radiation

When the solar radiation detected by the solar radiation sensor 70u is more than the predetermined reference and the solar radiation is impinging on the occupant M directly, the condition is determined to be "direct solar radiation." For instance, when the solar radiation directly impinges on the upper body (clothing part) M1 of the occupant M from the right side of the vehicle, the temperature of the side glass 171a and the upper body M1 of the occupant M (indicated by hatched lines in FIG. 29) becomes higher than that of the other parts (except the face part M3) in the detection areas 160. Thus, the direct solar radiation condition can be detected when the temperature of the upper body M1 of the occupant M is higher than the other parts (except the face part M3).

The target blowout air temperature TAO is changed based on the above solar radiation conditions. That is, the target temperature TAO is lowered as the solar radiation condition changes from the case (1) to the case (3) therough the case (2), so that the highest cooling is provided in the case (3) in which the solar radiation directly impinges on the occupant. In changing the target temperature TAO based on the above solar radiation conditions, the coefficients among KA to KP for the surface temperature signals of the upper body M1 of the occupant M may be changed based on the determined solar radiation conditions.

According to this embodiment, the air-conditioning control can be optimized to best match the sense of temperature of the occupant, because the air-conditioning control amount (at least one of temperature and air amount of the blowout air) is changed based on whether the solar radiation is direct or indirect.

(Modification)

In the first preferred embodiment, an outside air temperature sensor and a solar radiation sensor may be provided additionally for implementation of finer air-conditioning control. Any one of the plural surface temperature sensors 70a to 70p may also be used for detecting a temperature of the internal surface of the windshield.

Further, to prevent control hunting due to intermittent solar radiation onto the occupant, a sampling count may be set up properly for each surface temperature signal of the surface temperature sensors 70a to 70p. More specifically, in this arrangement, surface temperature signal output values attained through some sampling operations are averaged, and the resultant average value is used for calculation of a target blowout air temperature TAO.

Each of the coefficients KA to KP may be changed according to a compartment internal surface temperature, occupant's surface temperature, occupant's sensed temperature preference, occupant's physique, and air-conditioning loads (outside air temperature, inside air temperature, engine cooling water temperature, evaporator outlet temperature, vehicle speed, humidity, seat temperature). A physique of the occupant can be estimated from the positioning and states of vehicle devices (seat, steering wheel, inside rear view mirror, etc.) which are adjusted according to the occupant's physique. Further, some of the coefficients KA to KP corresponding to the 1st to 16th sections A to P may be changed according to other coefficients. Furthermore, to reflect the sensed temperature of the occupant during air-conditioning control, a coefficient for an output value of the surface temperature last sensor used for detecting a surface temperature of the occupant may be made larger or smaller than a coefficient for output values of the other sensors. Further, a compensation ratio and a delay time set for an output value of the surface temperature sensor used for detecting a surface temperature of the occupant may be made different from a compensation ratio and a delay time to be set for output values of the other sensors. Furthermore, the temperature detection direction and temperature detection visual-field range of the surface temperature sensors 70a to 70p can be variable. Specifically, they can be changed according to occupant's sensed temperature preference, occupant's physique, air-conditioning load and other factors.

Further, when an output value of each surface temperature signal varies, compensation is made at a predetermined compensation ratio to decrease variation of the output value. Accordingly, a target blowout air temperature is calculated using the output value thus compensated. In this manner, the compensation ratio can be changed according to occupant's sensed temperature preference, occupant's physique, air-conditioning load and other factors. Also, a compensation ratio set for some surface temperature signals can be different from the compensation ratio set for other surface temperature signals. It is also preferable to set up a compensation ratio independently for at least two or more surface temperature sensors.

Still further, each surface temperature signal output with a predetermined delay and delayed output value is used to calculate a target blowout air temperature. Here, delay time is changed according to occupant's sensed temperature preference, occupant's physique, air-conditioning load and other factors. A delay time set for some surface temperature signals may be made different from delay time set for other surface temperature signals. Further, a temperature detection visual-field range, a temperature detection point and a sampling count of each surface temperature sensor may be set up independently for at least two or more surface temperature sensors.

Also, while a target blowout air temperature TAO is calculated based on surface temperature signal output values TA to TP, a set temperature Tset and an inside air temperature Tr in the first preferred embodiment, the target occupant surface temperature can be compared to an actual occupant surface temperature. A target blowout air temperature TAO is calculated using the result of comparison, and feedback control is performed to regulate the actual occupant surface temperature to the target occupant surface temperature.

Still further, a means for changing each value of the coefficients KA to KP, a detection direction and detection visual-field range of each of the surface temperature sensors 70a to 70p, a compensation ratio, a delay time, and other factors can be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

While the above-described embodiments refer to examples of usage of the present invention, it is understood that the present invention may be applied to other usage, modifications and variations of the same, and is not limited to the disclosure provided herein.

What is claimed is:

1. An air conditioner for a vehicle having a heat exchanger in an air duct for performing heat exchange with air and temperature regulator means for adjusting airflow temperature of air from the air duct entering a vehicle compartment, the air conditioner arranged to control the temperature regulator means so that a temperature of blowout air from the air duct is regulated to a target blowout air temperature, the air conditioner comprising:

temperature setting means for setting a temperature of inside air desired by a vehicle occupant;

an inside air temperature sensor for detecting a temperature of inside air;

a first surface temperature sensor for detecting a temperature of an internal surface region of the vehicle compartment which varies with a temperature of an external surface of the vehicle; and a second surface temperature sensor for detecting a temperature of a surface region which varies with an intensity of solar radiation intruding into the vehicle compartment;

wherein the target blowout air temperature is calculated using input signals including a set temperature signal of the temperature setting means, an inside air temperature signal of the inside air temperature sensor, a first surface temperature signal of the first surface temperature sensor, and a second surface temperature signal of the second surface temperature sensor.

2. An air conditioner for a vehicle as in claim 1, wherein: the first surface temperature sensor detects a temperature of an internal surface of window glass.

3. An air conditioner for a vehicle as in claim 1, wherein: the second surface temperature sensor detects a surface temperature of clothing of the vehicle occupant.

4. An air conditioner for a vehicle as in claim 1, wherein:

a plurality of the surface temperature sensors are arranged on a single substrate at one location in the vehicle compartment.

5. An air conditioner for a vehicle as in claim 1, wherein:

a plurality of the surface temperature sensors are separately disposed at a plurality of locations in the vehicle compartment.

6. An air conditioner for a vehicle as in claim 1, wherein:

an output value of each of the surface temperature signals is multiplied by a coefficient which is set for each respective surface temperature signal, the target blowout air temperature being calculated by using a result of multiplication; and wherein the coefficient is set according to at least one a number of factors, the factors including a compartment internal surface temperature, occupant surface temperature, occupant sensed temperature preference, occupant's physique, and air-conditioning load.

7. An air conditioner for a vehicle as in claim 6, wherein:

some of the coefficients set for the surface temperature signals are changed according to the other coefficients.

8. An air conditioner for a vehicle as in claim 6, wherein:

the coefficients set for at least some of the surface temperature signals are set to have a value different from the coefficient values for remaining surface temperature signals.

9. An air conditioner for a vehicle as in claim 1, wherein:

at least a temperature detection direction or a temperature detection visual-field range is variable for each of the surface temperature sensors.

10. An air conditioner for a vehicle as in claim 1, wherein:

a plurality of the first surface temperature sensors and a plurality of the second surface temperature sensors are provided; and output values of the first surface temperature sensors are averaged, output values of the second surface temperature sensors are averaged, and the target blowout air temperature is calculated using the average values of the first surface temperature sensors and the average values of the second surface temperature sensors.

11. An air conditioner for a vehicle as in claim 1, wherein:

an output value is compensated at a predetermined compensation ratio when the output value from each of the surface temperature signals varies thereby decreasing variation of the output value, the target blowout air temperature is calculated using the compensated output value; and the compensation ratio is changed according to at least an occupant's sensed temperature preference, occupant's physique, and air-conditioning load.

12. An air conditioner for a vehicle as in claim 11, wherein:

the compensation ratios set for some of the surface temperature signals are set with a value different than compensation ratio values for remaining surface temperature signals.

13. An air conditioner for a vehicle as in claim 11, wherein:

the compensation ratios can be set independently for a plurality of the surface temperature sensors.

14. An air conditioner for a vehicle as in claim 1, wherein:

each of the surface temperature signals is output with a predetermined time delay, the target blowout air temperature being calculated with the delayed output; and the delay time is changed according to at least occupant's sensed temperature preference, occupant's physique, or air-conditioning load.

15. An air conditioner for a vehicle as in claim 14, wherein:

time delay periods set for at least some of the surface temperature signals are set with a different value than delay time periods for the remaining surface temperature signals.

16. An air conditioner for a vehicle as in claim 1, wherein:

at least a temperature detection direction and a temperature detection visual-field range of each of the surface temperature sensors is set according to at least occupant's sensed temperature preference, occupant's physique, or air-conditioning load.

17. An air conditioner for a vehicle as in claim 6, wherein:

the air-conditioning load includes at least outside air temperature, inside air temperature, solar radiation intensity, engine cooling water temperature, evaporator outlet temperature, vehicle speed, humidity, or seat temperature.

18. An air conditioner for a vehicle as in claim 17, wherein:

a temperature detection visual-field range, a temperature detection point and a sampling count of each the surface temperature sensor can be set up independently in a plurality of the surface temperature sensors.

19. An air conditioner for a vehicle having a heat exchanger in an air duct for performing heat exchange with air and temperature regulator means for adjusting airflow temperature of air from the air duct entering a vehicle compartment, the air conditioner controlling the temperature regulator means so that a temperature of blowout air from the air duct is regulated to a target blowout air temperature, the air conditioner comprising:

temperature setting means for setting a temperature of inside air desired by a vehicle occupant;

an inside air temperature sensor for detecting a temperature of inside air;

a first surface temperature sensor for detecting a temperature of an internal surface region of the vehicle compartment which varies with a temperature of an external surface of the vehicle; and a second surface temperature sensor for detecting a temperature of a surface of the vehicle occupant;

wherein the target blowout air temperature is calculated using input signals including a set temperature signal of the temperature setting means, an inside air temperature signal of by the inside air temperature sensor, a first surface temperature signal of the first surface temperature sensor, and a second surface temperature signal of the second surface temperature sensor.

20. An air conditioner for a vehicle as in claim 19, wherein:

the second surface temperature sensor detects surface temperature of at least one of clothing and skin of the vehicle occupant.

21. An air conditioner for a vehicle as in claim 19, wherein:

the second surface temperature sensor is constructed with a plurality of surface temperature sensing parts for detecting temperature of a plurality of divided areas, respectively; and an air-conditioning control amount is differentiated between a specified area of the divided areas where a temperature change therein is more than a predetermined reference and other areas of the divided areas.

22. An air conditioner for a vehicle as in claim 21, wherein:
the air-conditioning control amount is differentiated by controlling at least one of direction, amount and temperature of air blown out into the vehicle compartment.

23. An air conditioner for a vehicle as in claim 19, further comprising:
a solar radiation sensor for detecting solar radiation,
wherein, when the solar radiation is detected by the solar radiation sensor, the solar radiation is determined whether it is direct based on the first surface temperature signal and the second surface temperature signal and an air-conditioning control amount is differentiated between cases of direct solar radiation and indirect solar radiation.

24. An air conditioner for a vehicle as in claim 23, wherein:
the air-conditioning control amount is differentiated by controlling at least one of temperature and amount of air blown out into the vehicle compartment.

25. An air conditioner for a vehicle having a heat exchanger in an air duct for performing heat exchange with air and temperature regulator means for adjusting airflow temperature of air from the air duct entering a vehicle compartment, the air conditioner arranged to control the temperature regulator means so that a temperature of blowout air from the air duct is regulated to a target blowout air temperature, the air conditioner comprising:
temperature setting means for setting a temperature of inside air desired by a vehicle occupant;
an inside air temperature sensor for detecting a temperature of inside air;
a first surface temperature sensor for detecting a temperature of an internal surface region of the vehicle compartment which varies with a temperature of an external surface of the vehicle;
a second surface temperature sensor for detecting a surface temperature of clothing of the vehicle occupant; and
a third surface temperature sensor for detecting a surface temperature of skin of the vehicle occupant;
wherein the target blowout air temperature is calculated using input signals including a set temperature signal determined by the temperature setting means, an inside air temperature signal of the inside air temperature sensor, a first surface temperature signal of the first surface temperature sensor, a second surface temperature signal of the second surface temperature sensor, and a third surface temperature signal of the third surface temperature sensor.

26. An air conditioner for a vehicle having a heat exchanger in an air duct for performing heat exchange with air and temperature regulator means for adjusting airflow temperature of air from the air duct entering a vehicle compartment, the air conditioner arranged to control the temperature regulator means so that a temperature of blowout air from the air duct is regulated to a target blowout air temperature, the air conditioner comprising:
temperature setting means for setting an inside air temperature desired by a vehicle occupant;
sensed temperature information detecting means for detecting a physical value related to the sensed temperature of the vehicle occupant; and
a surface temperature sensor for detecting a temperature of a predetermined internal surface region of the vehicle compartment;
wherein the surface temperature sensor detects a surface temperature of an outside-air-temperature-related internal region which varies with an outside temperature and a surface temperature of a solar-radiation-related internal region which varies with an intensity of solar radiation; and
wherein the target blowout air temperature is calculated using input signals including a set temperature signal determined by the temperature setting means, a sensed temperature information signal detected by the sensed temperature information detecting means, and a surface temperature signal of the surface temperature sensor.

27. An air conditioner for a vehicle as in claim 26, wherein:
an output value of each of the surface temperature signals is multiplied by a coefficient, and the target blowout air temperature is calculated using the result of multiplication; and
the coefficient is changed according to the sensed temperature information signal.

28. An air conditioner for a vehicle as in claim 26, wherein:
the sensed temperature information detecting means detects at least one an outside air temperature, solar radiation intensity, or surface temperatures of clothing and skin of the vehicle occupant.

29. An air conditioner for a vehicle having a heat exchanger in an air duct for performing heat exchange with air and temperature regulator means for adjusting airflow temperature of air from the air duct entering a vehicle compartment, the air conditioner arranged to control the temperature regulator means so that a temperature of blowout air from the air duct is regulated to a target blowout air temperature, the air conditioner comprising:
temperature setting means for setting an inside air temperature desired by a vehicle occupant;
a glass surface temperature sensor for detecting a temperature of an internal surface of a window glass;
a ceiling surface temperature sensor for detecting a temperature of an internal wall surface of a vehicle ceiling; and
a clothing part surface temperature sensor for detecting a temperature of a clothing part of a vehicle occupant,
wherein the target blowout air temperature is calculated based on a set temperature signal of the temperature setting means, a glass surface temperature signal of the glass surface temperature sensor, a ceiling surface temperature signal of the ceiling surface temperature sensor and a clothing part surface temperature signal of the clothing part surface temperature sensor.

* * * * *